United States Patent
Minoura et al.

(10) Patent No.: US 6,844,956 B2
(45) Date of Patent: Jan. 18, 2005

(54) REFLECTIVE DISPLAY DEVICE AND RETRO-REFLECTOR USED THEREFOR

(75) Inventors: Kiyoshi Minoura, Tenri (JP); Shun Ueki, Tenri (JP); Masahiko Tomikawa, Funabashi (JP); Teiyu Sako, Kuki (JP); Masayuki Okamoto, Kashiwa (JP); Seiichi Mitsui, Kashiwa (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/608,216

(22) Filed: Jun. 30, 2003

(65) Prior Publication Data

US 2004/0085611 A1 May 6, 2004

Related U.S. Application Data

(62) Division of application No. 09/821,686, filed on Mar. 30, 2001, now Pat. No. 6,657,766.

(30) Foreign Application Priority Data

| Mar. 31, 2000 | (JP) | ......................................... 2000-96075 |
| Jul. 27, 2000 | (JP) | ....................................... 2000-227760 |
| Mar. 27, 2001 | (JP) | ......................................... 2001-90908 |

(51) Int. Cl.[7] .............................. G02F 1/03; G02F 1/07
(52) U.S. Cl. ...................................... 359/263; 359/245
(58) Field of Search .............................. 359/263, 245, 359/530

(56) References Cited

U.S. PATENT DOCUMENTS

| 3,905,682 | A | | 9/1975 | Meyerhofer | ................. 349/113 |
| 3,918,795 | A | * | 11/1975 | Lindner et al. | .............. 359/546 |
| 4,660,929 | A | * | 4/1987 | Sick | ............................ 359/534 |
| 4,930,870 | A | * | 6/1990 | Beach et al. | ................. 359/530 |
| 5,182,663 | A | | 1/1993 | Jones | ......................... 349/113 |
| 5,929,956 | A | | 7/1999 | Neijzen et al. | .............. 349/113 |
| 6,353,489 | B1 | * | 3/2002 | Popovich et al. | .............. 359/15 |
| 6,657,766 | B2 | * | 12/2003 | Minoura et al. | ............. 359/263 |
| 2001/0040717 | A1 | | 11/2001 | Minoura et al. | ............. 359/263 |
| 2002/0030774 | A1 | | 3/2002 | Yoshii et al. | ................ 349/113 |
| 2002/0043931 | A1 | | 4/2002 | Minoura et al. | ............. 313/506 |

FOREIGN PATENT DOCUMENTS

| JP | 54-105998 A | 8/1979 |
| JP | 3-186816 A | 8/1991 |
| JP | 11-7008 A | 1/1999 |

OTHER PUBLICATIONS

Neudeck et al, "Precision Crystal Corner Cube Arrays for Optical Grantings Formed by (100) Silicon Planes with Selective Epitaxial Growth", Applied Optics, vol. 35, No. 19, Jul. 1, 1996, pp. 3466–3470.

Encyclopedia of the eye, the web version, Okuzawa, Jul., 1999. pp. 1–22.

* cited by examiner

*Primary Examiner*—Georgia Epps
*Assistant Examiner*—M. Hasan
(74) *Attorney, Agent, or Firm*—Nixon & Vanderhye P.C.

(57) ABSTRACT

A reflective display device includes a switching layer, placed between substrates, for switching between a transmissive state for allowing transmission of incident light and a scattering state for scattering the incident light, and a retro-reflector for reflecting an incident ray from the liquid crystal layer so that an outgoing ray of the reflected light is parallel to the incident ray. A pitch of smallest unit structures of the retro-reflector is set to be larger than 0 mm and not more than 5 mm. The retro-reflector is preferably in a form of a corner cube array and has light absorbing surface portions at borders of the smallest unit structures. With this reflective display device, brightness of white state and contrast ratio can be improved.

3 Claims, 27 Drawing Sheets

SCATTERING STATE (WHITE STATE)   TRANSMISSIVE STATE (BLACK STATE)

ELECTRIC FIELD OFF    ELECTRIC FIELD ON

VIEW FROM ①

VIEW FROM ②

VIEW FROM ③

F I G. 4
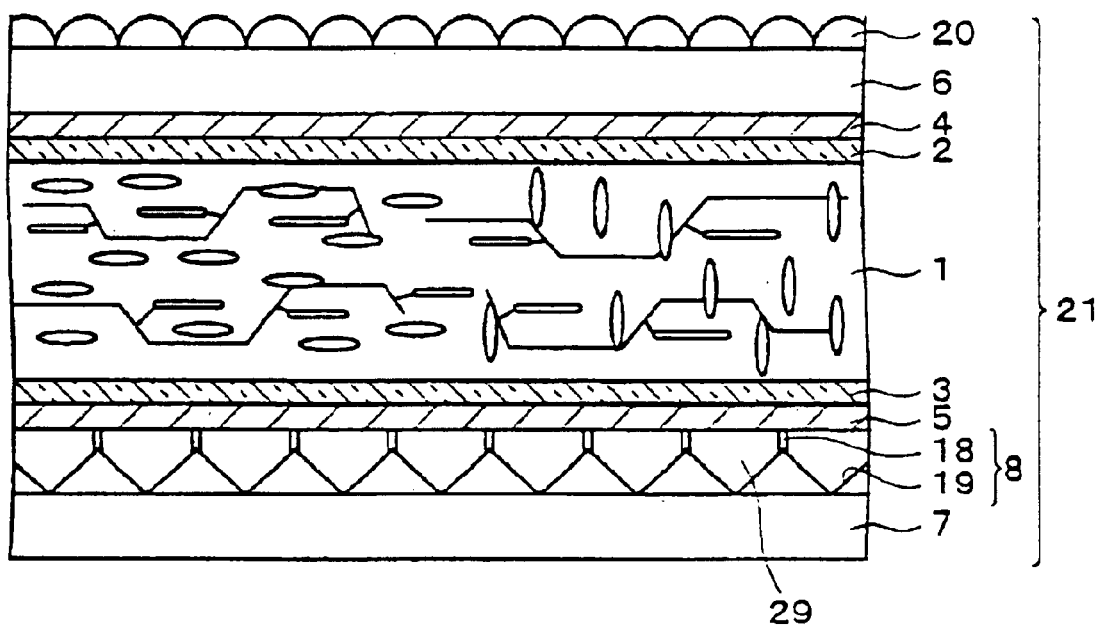
ELECTRIC FIELD OFF   ELECTRIC FIELD ON

ELECTRIC FIELD OFF   ELECTRIC FIELD ON

EXPOSURE

Ag DEPOSITION

F I G. 8(a)
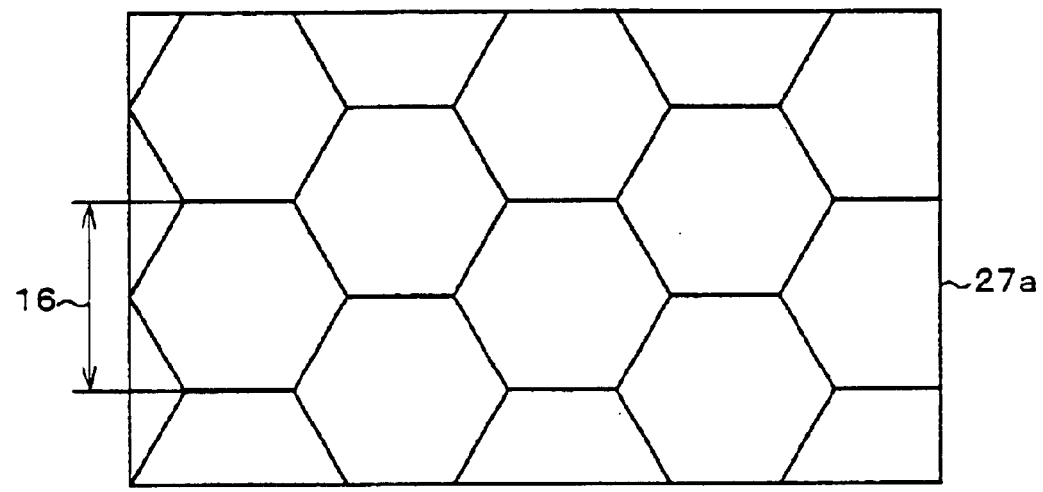
F I G. 8(b)
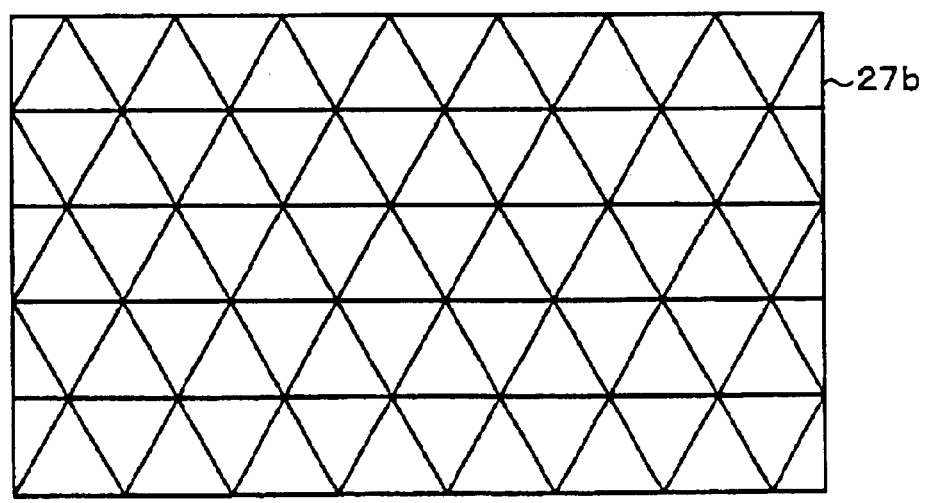

F I G. 1 2 (a)
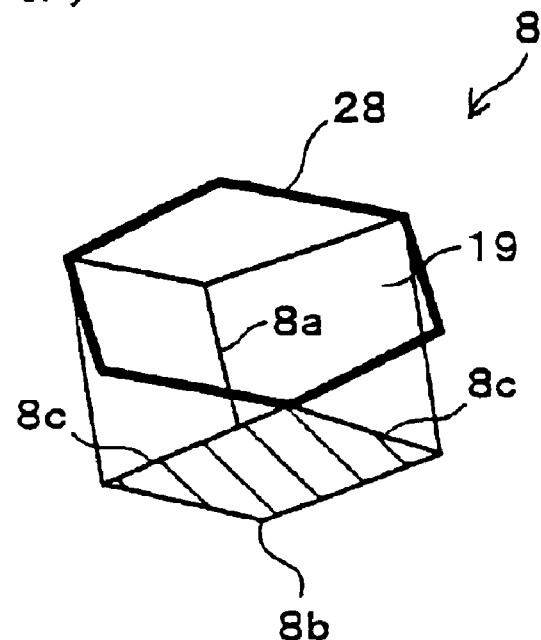
F I G. 1 2 (b)
VIEW FROM TOP
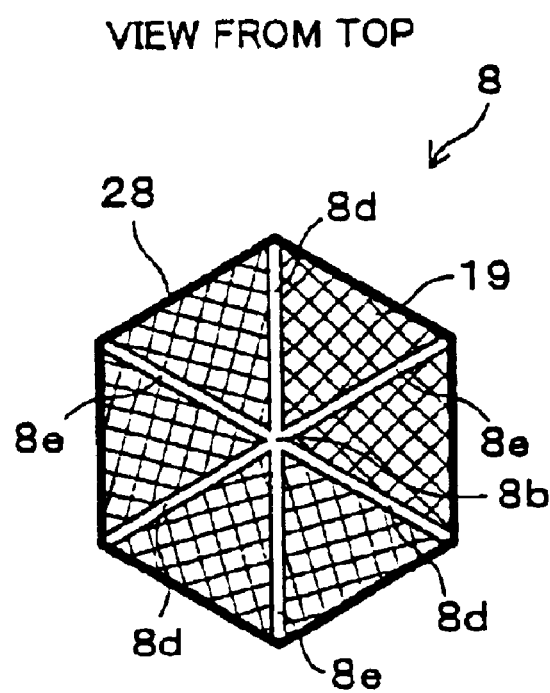

VIEW FROM TOP

VIEW FROM TOP

ELECTRIC FIELD OFF    ELECTRIC FIELD ON

SCATTERING STATE (WHITE STATE)    TRANSMISSIVE STATE (BLACK STATE)

SCATTERING STATE (WHITE STATE)     TRANSMISSIVE STATE (BLACK STATE)

F I G. 2 4
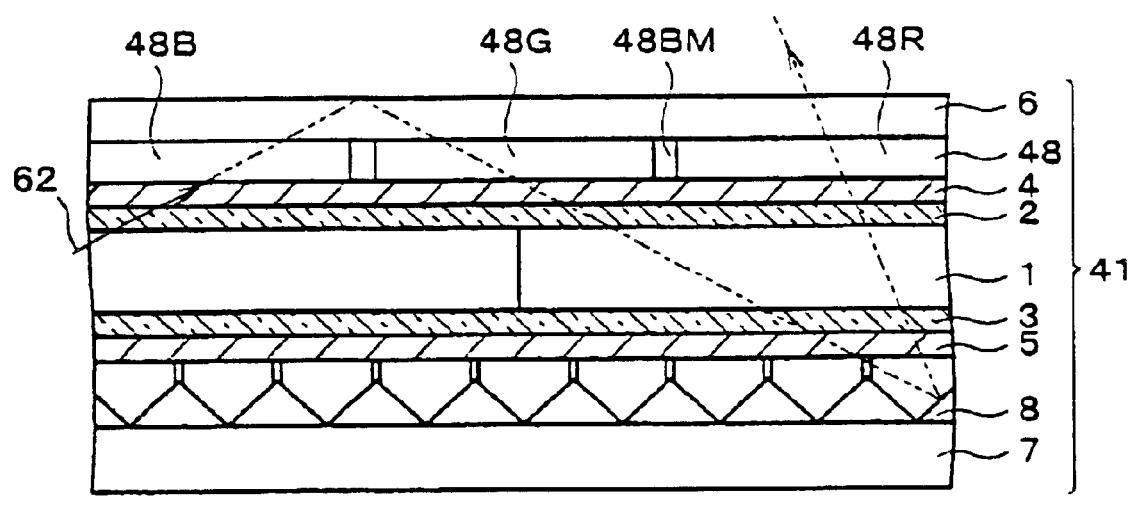
SCATTERING STATE
(WHITE (BRIGHT) STATE)
TRANSMISSIVE STATE
(BLACK (DARK) STATE)

REFLECTIVE DISPLAY DEVICE AND RETRO-REFLECTOR USED THEREFOR

This application is a Divisoinal of Application Ser. No. 09/821,686 filed Mar. 30, 2001. Now U.S. Pat. No. 6,657,766, the entire content of which is hereby incorporated herein by reference in this application.

FIELD OF THE INVENTION

The present invention relates to a reflective display device which is capable of clear full-color display with a bright white state and a high contrast ratio without a polarizer, and to a retro-reflector used therefor.

BACKGROUND OF THE INVENTION

Liquid crystal display devices have been widely used conventionally as thin and light-weight color display devices. Among such color liquid crystal display devices, most commonly used are transmissive liquid crystal display devices which employ a back light source. The transmissive liquid crystal display devices have been used in an increasingly wider variety of field for various uses.

What contrasts to the transmissive liquid crystal display devices are reflective liquid crystal display devices which employ other display modes, whereby reflected light of a light source (natural light or surrounding light) is used for display. The reflective liquid crystal display devices therefore utilize a light source instead of a back light and do not require a back light, thus having such features as reducing power for the back light and saving a space or weight thereof.

That is, power consumption of the display device can be reduced as a whole, which permits the use of smaller batteries, making the reflective liquid crystal display devices suitable for equipment which is required to be thin and light-weight. Further, given the same size or weight of the equipment, the reflective liquid crystal display devices allows the use of larger batteries, making it possible to greatly increase the operation time.

Further, the reflective liquid crystal display devices also have advantages over other display devices in view of contrast ratio characteristics of the display. That is, in self-emitting display devices such as a CRT, a significant reduction in contrast ratio is incurred under day light outside. Such a significant reduction in contrast ratio occurs also in transmissive liquid crystal display devices, that low reflection films are coated on, when the intensity of the surrounding light is much larger than display light, as in the case under direct sun light. On the other hand, the reflective liquid crystal display devices can obtain display light which is proportional to the quantity of the surrounding light, and can avoid a reduction in contrast ratio, and therefore are suitable particularly for portable information terminals, digital video cameras, or portable video cameras, etc., which are often used outside.

Despite such promising applications, there has been no reflective color liquid crystal display device which meets the demand for practical applications. This is chiefly due to the fact that conventional reflective color liquid crystal display devices were insufficient in terms of reflectance contrast ratio, full-color display, high-definition display, and their ability to display moving images.

The following describes conventional reflective liquid crystal display devices in more detail. Currently, the reflective liquid crystal display devices which are widely used employ a pair of or a single polarizer. The operation modes of these liquid crystal display devices include a twist nematic mode ("TN mode" hereinafter) which performs display by controlling optical rotatory power of the liquid crystal layer by an electric field, a birefringence mode ("ECB mode" hereinafter) which performs display by controlling birefringence of the liquid crystal layer by an electric field, and a mix mode, which is a combination of the TN mode and the ECB mode.

Meanwhile, there have been known reflective liquid crystal display devices which do not employ a polarizer. Guest-Host-type liquid crystal elements, which incorporate a dye in liquid crystal, have been developed for this mode, which, however, had the problem of low reliability due to the addition of the dichroic dye, and the problem of low contrast ratio which is posed by the low dichroic ratio of the dye. This deficiency in contrast ratio in particular results in a significant reduction in color purity in color display using a color filter. Therefore, such reflective liquid crystal display devices which lack a contrast ratio need to be combined with a color filter having high color purity. The reflective liquid crystal display devices therefore have the problem of low brightness when the high color purity color filter is used, which spoils the advantage of high brightness of the mode which omits the polarizer.

In order to overcome the foregoing problems, there has been developed a liquid crystal display element of a mode which employs a polymer-dispersed-type liquid crystal or a cholesteric liquid crystal, which is intended for bright and high-contrast ratio display without using a polarizer or a dye. These modes take advantage of the characteristic of the liquid crystal layer which is optically switched between a transmissive state and a scattering state, or between a transmissive state and a reflective state, by controlling an applied voltage to the liquid crystal layer. Further, no polarizer is required in these modes and the efficiency of using light can be improved.

Further, from the perspective of evaluation on color fidelity, a desirable white state can be expected in these modes compared with the TN mode or ECB mode, because the wavelength dependency is low and the problem of absorption profile of the polarizer itself, i.e., the problem of the polarizer absorbing blue light and the light transmitting through the polarizer is rendered yellow, is not posed.

Such a mode is disclosed, for example, in Japanese Unexamined Patent Publication No. 186816/1991 (Tokukaihei 3-186816) (publication date: Aug. 14, 1991). In the liquid crystal display device in this publication, a polymer-dispersed-type liquid crystal is disposed on a black substrate, wherein a white/black state is performed by the white state, which is rendered by the scattering state of the polymer-dispersed-type liquid crystal which appears murky under no applied voltage, and by the black state, which is rendered by the transmissive state of the polymer-dispersed-type liquid crystal through which the underlying black substrate becomes visible under applied voltage.

U.S. Pat. No. 3,905,682 (publication date: Sep. 16, 1975) discloses a liquid crystal device having a light modulating layer using a light-scattering-type liquid crystal, and a retro-reflector. Japanese Unexamined Patent Publication No. 105998/1979 (Tokukaisho 54-105998) (publication date: Aug. 20, 1979) discloses a reflective liquid crystal display device including a light modulating layer using a light-scattering-type liquid crystal or a Guest-Host-type liquid crystal, louvers, and a retro-reflector. Further, U.S. Pat. No. 5,182,663 (publication date: Jan. 26, 1993) discloses a liquid crystal device including a light modulating layer using a light-scattering-type liquid crystal, and a corner cube array.

However, in the liquid crystal display device of the foregoing publication No. 3-186816, only the backward scattered light from the polymer-dispersed-type liquid crystal contributes to reflectance of the white state in the white state, and the forward scattered light is absorbed entirely by the black substrate, and the actual efficiency of utilizing light suffers greatly.

In the liquid crystal display device disclosed in U.S. Pat. No. 3,905,682, a black state is realized when the liquid crystal layer is in a transmissive state. A display quality of the black state by retro-reflection is dependent on retro-reflectivity, and is strongly influenced by the size of the smallest unit structure of the retro-reflector. However, this patent U.S. Pat. No. 3,905,682 does not teach a mechanism for realizing a black state or a size of the smallest unit structure of the retro-reflector.

Further, the retro-reflector disclosed in the embodiment of this patent is a retro-reflector which is realized by a corner cube array or an array of tiny spheres, neither of which, however, possess sufficient retro-reflectivity, and a desirable black state cannot be obtained. Further, this patent is silent as to a detailed structure of a retro-reflector with sufficient retro-reflectivity. Further, there is a problem of poor display quality of a black state when the display is viewed from a direction inclined with respect to a direction normal to the display surface.

In the reflective liquid crystal display device disclosed in the foregoing publication No. 54-105998, louvers having an absorbing site are disposed on the front side of the retro-reflector on the side of the viewer, and since the retro-reflector is covered with the louvers with respect to light rays incident on the liquid crystal display device from the side of the viewer, all the incident light is absorbed at the absorbing site of the louvers to realize a desirable black state, and the light rays which are incident on the liquid crystal display device from the side of the light source directly reach the retro-reflector through the louvers.

However, this publication is also silent as to the size of the smallest unit structure of the retro-reflector, and a mechanism for realizing a black state, and, while it solves the problem of the U.S. Pat. No. 3,905,682, brightness in white state suffers because the area occupied with the absorbing site of the louvers is too large.

Further, none of the foregoing conventional arrangements consider a relation between a pitch of the smallest unit structures of the retro-reflector and a pitch of the color filters. Therefore, when the color filters are provided in the foregoing arrangements, rays of incident light and outgoing light pass through different color filters, which results in reduction in luminance and chromaticity due to mixed colors.

The foregoing problems are also common in reflective display devices in general, other than the liquid crystal display devices.

SUMMARY OF THE INVENTION

The present invention was made in view of the foregoing problems and it is an object of the present invention to provide a reflective display device which is capable of clear multi-color display with a bright white state and a high contrast ratio, and which can prevent a reduction in luminance and chromaticity due to mixed colors, and to provide a retro-reflector used therefor.

In order to achieve the foregoing object, a reflective display device of the present invention includes: a switching layer for switching between a first state which allows transmission of incident light and a second state which changes a direction of travel of the incident light; and reflecting means, wherein the reflecting means is adapted to realize a black state by reflecting an image of a "black part" (cornea) of an eye of an observer when the switching layer is in the first state, and as the observer recognizes the image of the cornea.

In order to achieve the foregoing object, another reflective display device of the present invention includes: a switching layer for switching between a transmissive state for allowing transmission of incident light and a scattering state for scattering the incident light; and a retro-reflector as reflecting means, wherein a pitch of smallest unit structure of the retro-reflector is larger than 0 mm and not more than 5 mm.

In order to achieve the foregoing object, yet another reflective display device of the present invention includes: a switching layer for switching between a transmissive state for allowing transmission of incident light and a scattering state for scattering the incident light; and a retro-reflector as reflecting means, wherein a pitch of a smallest unit structure of the retro-reflector is not more than half a diameter of the black part of an eye (cornea) of an observer.

With the foregoing arrangements wherein a pitch of a smallest unit structure of the retro-reflector is set within the foregoing ranges, it is possible to prevent adverse effects on black state, which are caused by the smallest unit structure of the retro-reflector, thus improving both brightness of white state and improving contrast ratio.

In order to achieve the foregoing object, still another reflective display device of the present invention includes: a switching layer for switching between a transmissive state for allowing transmission of incident light and a scattering state for scattering the incident light; color filter sections, which are provided corresponding one to one to respective pixels; and a retro-reflector as reflecting means, wherein a pitch of a smallest unit structure of the retro-reflector is not more than a pitch of the color filter sections.

With this arrangement, since the pitch of the smallest unit structure of the retro-reflector is not more than a pitch of the color filter sections, the light incident on the retro-reflector through any color filter is reflected by the retro-reflector and outgoes from the device by passing through the same color filter.

This arrangement solves the problem of the incident ray and the outgoing ray passing through different color filters, thereby preventing a reduction in luminance and chromaticity due to mixed colors.

A retro-reflector of the present invention includes: a plurality of adjoining retro-reflecting sections for reflecting light so that an outgoing ray of the reflected light is parallel to an incident ray; and a light absorbing surface portion, provided at borders of the retro-reflecting sections, for absorbing light.

Therefore, with this arrangement, by the provision of the light absorbing surface portion, when applied to a reflective display device, deterioration of black state can be prevented therein. As a result, with this arrangement, brightness of white state and a contrast ratio can be improved in the reflective display device.

Here, the "pitch of the unit structure" of the retro-reflector is the shortest distance between corresponding positions (e.g., between vertices of corner cube array) of adjacent corner cubes (smallest unit structure), for example, in the case of the retro-reflector of a corner cube array type, and between corresponding positions (e.g., between centers of the beads) of adjacent beads in the case of the retro-reflector of a bead (microsphere) array type.

Further, the "pitch of the color filter sections" is the shortest distance between corresponding positions of adjacent color filter sections (e.g., between centers of the color filter sections) when the color filter sections of R (red), G (green), and B (blue) are disposed in a predetermined array pattern.

For a fuller understanding of the nature and advantages of the invention, reference should be made to the ensuing detailed description taken in conjunction with the accompanying drawings.

BRIEF DESCRIPTION OF THE DRAWINGS

FIG. 2(a) through FIG. 2(c) are explanatory drawings showing paths of a light beam incident on retro-reflectors of respective embodiments of the present invention, in which FIG. 2(a) shows how incident light from an area in the vicinity of the observer's eye is reflected by a corner cube acting as the retro-reflector; FIG. 2(b) shows a range of incident light on the corner cube of FIG. 2(a); and FIG. 2(c) shows a range of incident light on a micro sphere when micro spheres are used as the retro-reflector.

FIG. 3(a) through FIG. 3(d) are explanatory drawings showing a smallest unit structure (corner cube) of corner cube arrays used in the respective embodiments of the present invention, in which FIG. 3(a) is a perspective view; FIG. 3(b) is a plan view as viewed from a normal direction ①; FIG. 3(c) is a side view in a side direction ② of FIG. 3(a); and FIG. 3(d) is a front view from a front direction ③ of FIG. 3(a).

FIG. 4 is a cross sectional view showing a structure of a reflective liquid crystal display device of the Second Embodiment.

FIG. 8(a) is an explanatory drawing showing a photomask used in manufacture of sample A having the corner cube shape in accordance with the Second Embodiment.

FIG. 8(b) is an explanatory drawing showing a photomask used in manufacture of sample C having the corner cube shape in accordance with the Second Embodiment.

FIG. 12(a) and FIG. 12(b) are explanatory drawings showing a retro-reflector without a light shielding section, which corresponds to a vertex or a side of the retro-reflector for comparison, in which FIG. 12(a) is a perspective view; and FIG. 12(b) is a plan view.

FIG. 13(a) and FIG. 13(b) are explanatory drawings showing the retro-reflector with a light shielding section, which corresponds to a vertex or a side of the retro-reflector, in which FIG. 13(a) is a perspective view; and FIG. 13(b) is a plan view.

FIG. 14(a) and FIG. 14(b) are explanatory drawings showing the retro-reflector without the light shielding section, which corresponds to a vertex or a side of the retro-reflector for comparison, in which FIG. 14(a) is a perspective view; and FIG. 14(b) is a plan view.

FIG. 15(a) and FIG. 15(b) are explanatory drawings showing the retro-reflector with the light shielding section, which corresponds to a vertex or a side of the retro-reflector, in which FIG. 15(a) is a perspective view; and FIG. 15(b) is a plan view.

FIG. 24 is a cross sectional view showing a structure employing a color filter layer as a light absorbing layer in the reflective liquid crystal display device in accordance with the Third Embodiment.

DESCRIPTION OF THE EMBODIMENTS

Figure 1:
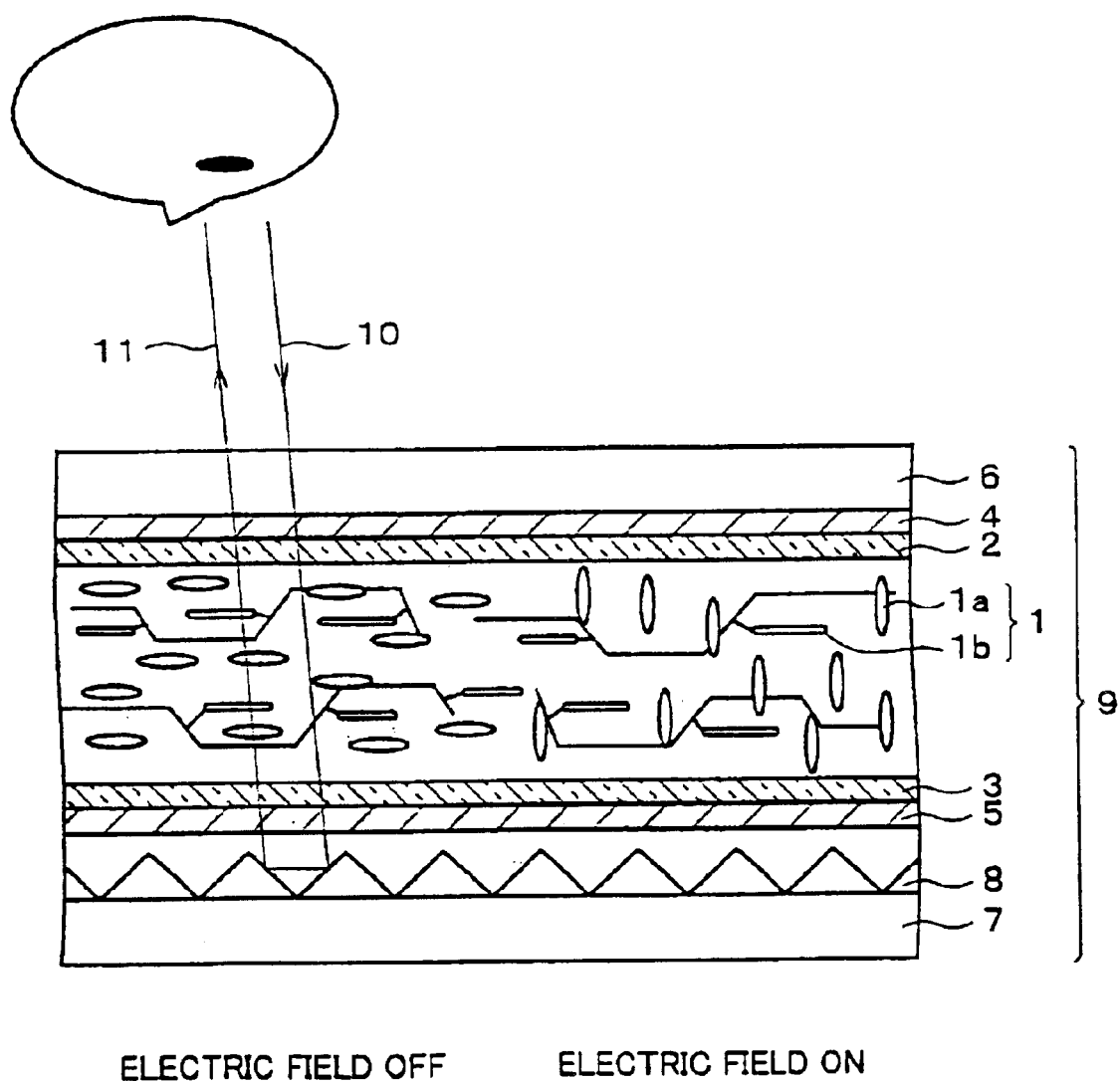
FIG. 1 is a cross sectional view showing a structure of a reflective liquid crystal display device in accordance with First and Second Embodiments of the present invention.

The following will describe embodiments of the present invention referring to the attached drawings. FIG. 1 is a cross sectional view showing a structure of reflective liquid crystal display devices (reflective display devices) in accordance with the embodiments of the present invention.

The reflective liquid crystal display devices include a liquid crystal layer (switching layer) 1 between an incident substrate 6 and an opposing reflection substrate 7. The incident substrate 6 and the reflection substrate 7 are made of a material such as a transparent (light-transmissive) glass plate or a transmissive polymer film.

On the reflection substrate 7 is provided a retro-reflector (reflecting means) 8 so that reflected light off the liquid crystal display device 9 is directed toward the incident substrate 6. The retro-reflector 8 is adapted to realize a black state by reflecting an image of the black (or dark) part of an eye (cornea) of the observer. As will be appreciated by those skilled in the art, the term "black" as used herein means dark.

Such a retro-reflector 8 may be adapted to reflect light which is incident thereon from the side of the incident substrate 6 so that an outgoing ray of the reflected light is substantially parallel to the incident ray (substantially antiparallel).

The retro-reflectors 8 used in the embodiments of the present invention are prepared by molding acrylic resin using a mold and by depositing silver on a reflective surface thereof to a thickness of 2000 A. The acrylic resin takes the color of black, for example, by addition of carbon black.

The incident substrate 6 and the reflection substrate 7 has electrodes 4 and 5, respectively, for applying a voltage (electric field) to the liquid crystal layer 1. The electrodes 4 and 5 are formed, corresponding to pixels for a display. The electrodes 4 and 5 have a predetermined pattern for applying a voltage in accordance with a display image to the pixels of the liquid crystal layer 1. Voltage applying means for the electrodes 4 and 5 may be activematrix elements, etc. Such voltage applying means is not particularly limited and any kinds of voltage applying means may be used in the present invention.

Further, the respective surfaces of the electrodes 4 and 5 on the side of the liquid crystal layer 1 are coated with planar alignment films 2 and 3 in contact with the liquid crystal layer 1. The planar alignment films 2 and 3 are set so that the liquid crystal layer 1 has a planar aligned state under no applied voltage. The embodiments of the present invention employ the planar alignment films but the types of alignment films are not particularly limited.

In the embodiments of the present invention, the liquid crystal layer 1 is a polymer-dispersed-type liquid crystal, which is one form of light scattering liquid crystal. The polymer-dispersed-liquid crystal is obtained by placing a uniform mixture (prepolymer-liquid crystal mixture) of a low-molecular-weight liquid crystal composition and prepolymer between the substrates and by polymerizing the pre-polymer therein.

Specifically, the polymer-dispersed-liquid crystal can be produced by adding a small amount of a polymerization initiator (product name: Irgacure 651, provided by Cibageigy) to a mixture of a UV curable liquid crystal prepolymer and a liquid crystal composition (product name TL213 of Merck & Co., Inc.; $\Delta n=0.238$) at the weight ratio of 20:80, followed by irradiation of UV light while the mixture shows a nematic crystal phase at room temperature. This producing method does not require a heating process, and damages to other members can be reduced.

However, not limiting to this, the same effects can be obtained also by using any of the following switching layers for the liquid crystal layer 1.

Any switching layer can be used as long as it has a transmissive state (first state) which allows transmission of light without changing a direction of travel (including transmission of incident light via refraction), and a state (second state) which changes a direction of travel of incident light, i.e., a state which involves at least scattering action.

For example, the light scattering liquid crystal may be any of a polymer-dispersed-type liquid crystal, a nematic-cholesteric phase transition liquid crystal, a polymer-dispersed-liquid crystal having the holographic function or diffraction function, a liquid crystal gel, and all the like.

More specifically, in a mode which employs the cholesteric liquid crystal, the transmissive state and the reflecting state which is rendered scattering are switched by controlling the domain size or helical axis of the liquid crystal. The polymer-dispersed-liquid crystal having the holographic function can be produced, for example, by exposing scattered light on a prepolymer-liquid crystal mixture, and by polymerizing the molecules. A mode which employs the polymer-dispersed-liquid crystal having the holographic function switches between the transmissive state and the reflecting state which is rendered scattering.

The following explains display principles of the foregoing reflective liquid crystal display devices. First, an operation of white state will be described. Under applied voltage, liquid crystal molecules 1a of the liquid crystal layer 1 direct in a direction of the electric field, and because the direction of mesogen cores 1b of polymer molecules remains the same, there occurs a disagreement in refractive index between the two, and as a result the liquid crystal layer 1 is in a scattering state. When light is incident on the liquid crystal layer 1 in the scattering state, the steering light and forward scattered light through the liquid crystal layer 1 are reflected at the retro-reflector 8 and then scattered as they again pass through the liquid crystal layer 1 in the scattering state, thereby returning more light, not only the backward scattered light, to the viewer (observer).

Here, in addition to the inefficient backward scattered light, the steering light and the forward scattered light passing through the liquid crystal layer 1 are used, thus obtaining highly bright display. Note that, the liquid crystal molecules 1a are held at predetermined intervals by the mesogen cores 1b of the The following explains an operation of a black (or dark) state. Under no applied voltage, the liquid crystal, molecules 1a of the liquid crystal layer 1 orient in the direction of the mesogen cores 1b of the polymer molecules, and the liquid crystal layer 1 is in the transmissive state. Tracing the light path onto an eye of the observer of the display, the light is refracted by the incident substrate 6 and the liquid crystal layer 1, and after being reflected by the retro-reflector 8, it is refracted again by the incident substrate 6 and the liquid crystal layer 1 before it finally reaches an area in the vicinity of the observer's eye.

That is, outgoing ray 11 which the observer sees in entirely an incident ray 10 originating from the area in the vicinity of the observer's eye. (e.g., sees FIGS. 1 and 2(a)). Here, the black state is effected when the area in the vicinity of the observer's eye is sufficiently small so that no light can make up a light source, e.g., smaller than the black part of the eye (an eyelid and a white part of an eye can be considered as an indirect light source).

[First Embodiment]

In this embodiment, a plurality of reflective liquid crystal display devices having different pitches of smallest unit structures of the retro-reflector 8 were prepared, and a black state was observed by visual inspection. Specifically, twelve kinds of reflective liquid crystal display devices having retro-reflectors of a corner cube array, a micro sphere array, and a micro lens array, each type of the retro-reflector having smallest unit structures of pitches 0.5 mm, 5 mm, 10 mm, and 25 mm, were prepared.

The result showed that the retro-reflectors of the corner cube array, the micro sphere array, and the micro lens array all realized a desirable black state with the pitches of 0.5 mm and 5 mm. The retro-reflectors of the respective types with the pitches 10 mm and 25 mm resulted in a black state that was too bright, reflecting the white part of the eye (portion of sclera) at the retro-reflectors.

Figure 2A:
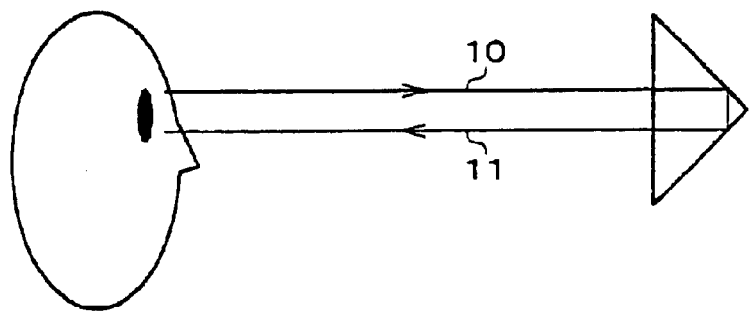
Figure 2B:
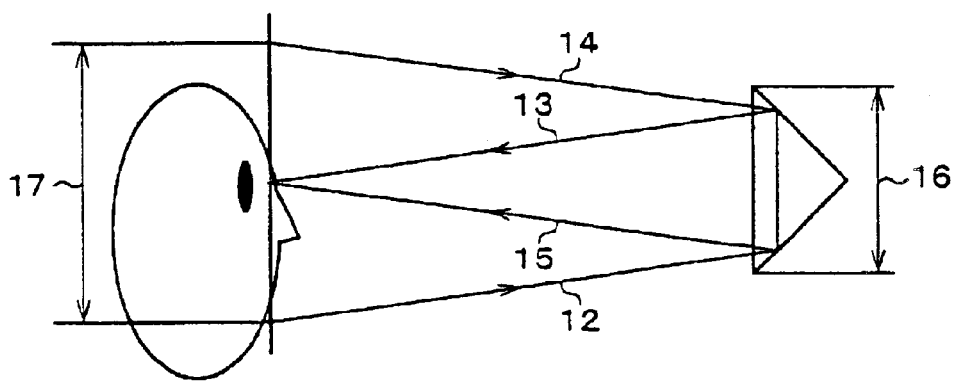
Figure 2C:
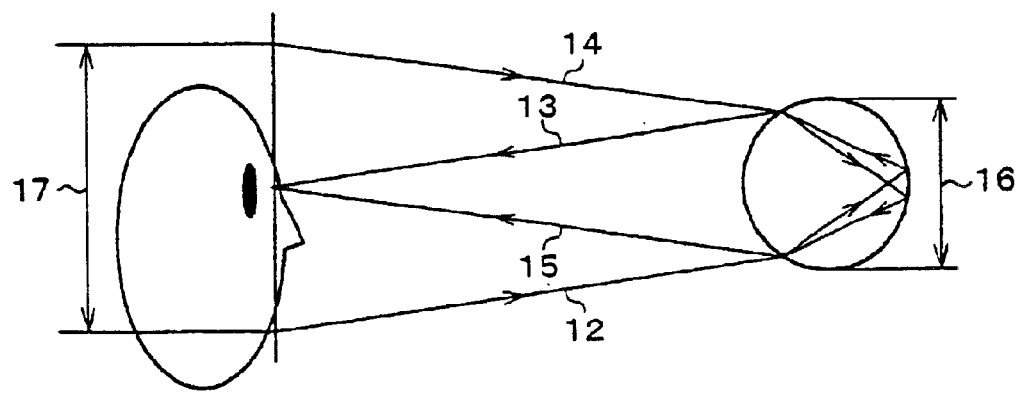
Figure 3A:
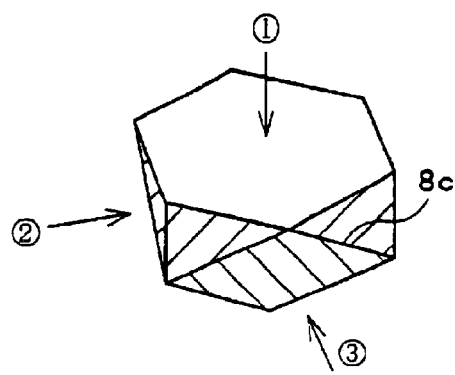
Figure 3B:
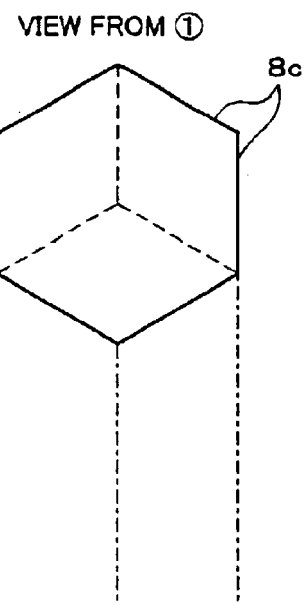
Figure 3C:
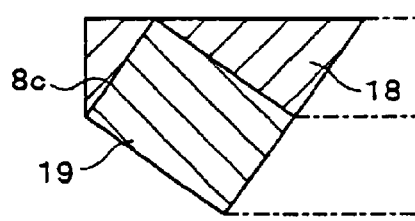
Figure 3D:
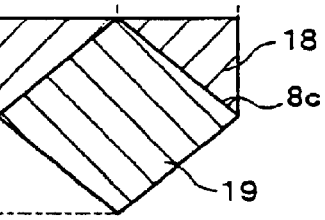

The following examines this result with reference to FIG. 2(a) through FIG. 2(c). When the observer is observing the center or near center of a smallest unit structure of the retro-reflector, the location of the light source of the observed light is in the very vicinity of the observer's eye. That is, in this case, the ray 10 which is incident on the reflective liquid crystal display device from the very vicinity of the observer's eye is reflected by the retro-reflector and the observer sees the outgoing ray 11.

Further, as shown in FIG. 2(b), when the observer is observing an upper end portion of the smallest unit structure of the retro-reflector, the location of the light source of the light which the observer sees is below the observer's eye. That is, in this case, a ray 12 which is incident on the reflective liquid crystal display device from the area below the observer's eye is reflected by the retro-reflector and the observer sees an outgoing ray 13 of the reflected light. Here, when the pitch of the smallest unit structures of the retro-reflector is larger, the observer will see a portion (white part) of the eye below the iris, or the eyelid, depending on the pitch size.

Further, when the observer is observing a lower end portion of the smallest unit structure of the retro-reflector, the location of the light source of the light which the observer sees will be an area above the observer's eye. That is, in this case, a ray 14 which is incident on the reflective liquid crystal display device from an area above the observer's eye is reflected by the retro-reflector and the observer sees an outgoing ray 15 of the reflected light. Here, when the pitch of the smallest unit structures of the retro-reflector is larger, the observer will see a portion (white part) of the eye above the iris, or the eyelid.

Therefore, the image mirrored by the smallest unit structure of the retro-reflector has a length 17, which is two times a pitch 16 of the smallest unit structure of the retro-reflector. That is, in order to realize a desirable black state, the image within a plane of the length 17, which is two times the pitch 16 of the smallest unit structure of the retro-reflector, needs to be smaller than the black part of the eye, and, considering that the size (diameter) of the black part of the eye is about 10 mm (*Encyclopedia of the eye*, Yasumasa Okuzawa, published by Higashiyama Shobo), it can be deduced that the pitch 16 of the smallest unit structure of the retro-reflector needs to be not more than 5 mm, which coincides with the result in the present embodiment. Thus, it was shown that the pitch 16 of the smallest unit structure of the retro-reflector needs to be not more than 5 mm.

Note that, FIG. 2(c) shows an arrangement where a bead (micro sphere) is used as the smallest unit structure of the retro-reflector 8. As shown in this drawing, the relation between the observer and the reflected light from the retro-reflector 8 is also the same as the case of FIG. 2(b) which uses the retro-reflector of the corner cube. The arrangement which employs the bead (micro sphere) as the smallest unit structure of the retro-reflector 8 will be described later in more detail.

Figure 6:
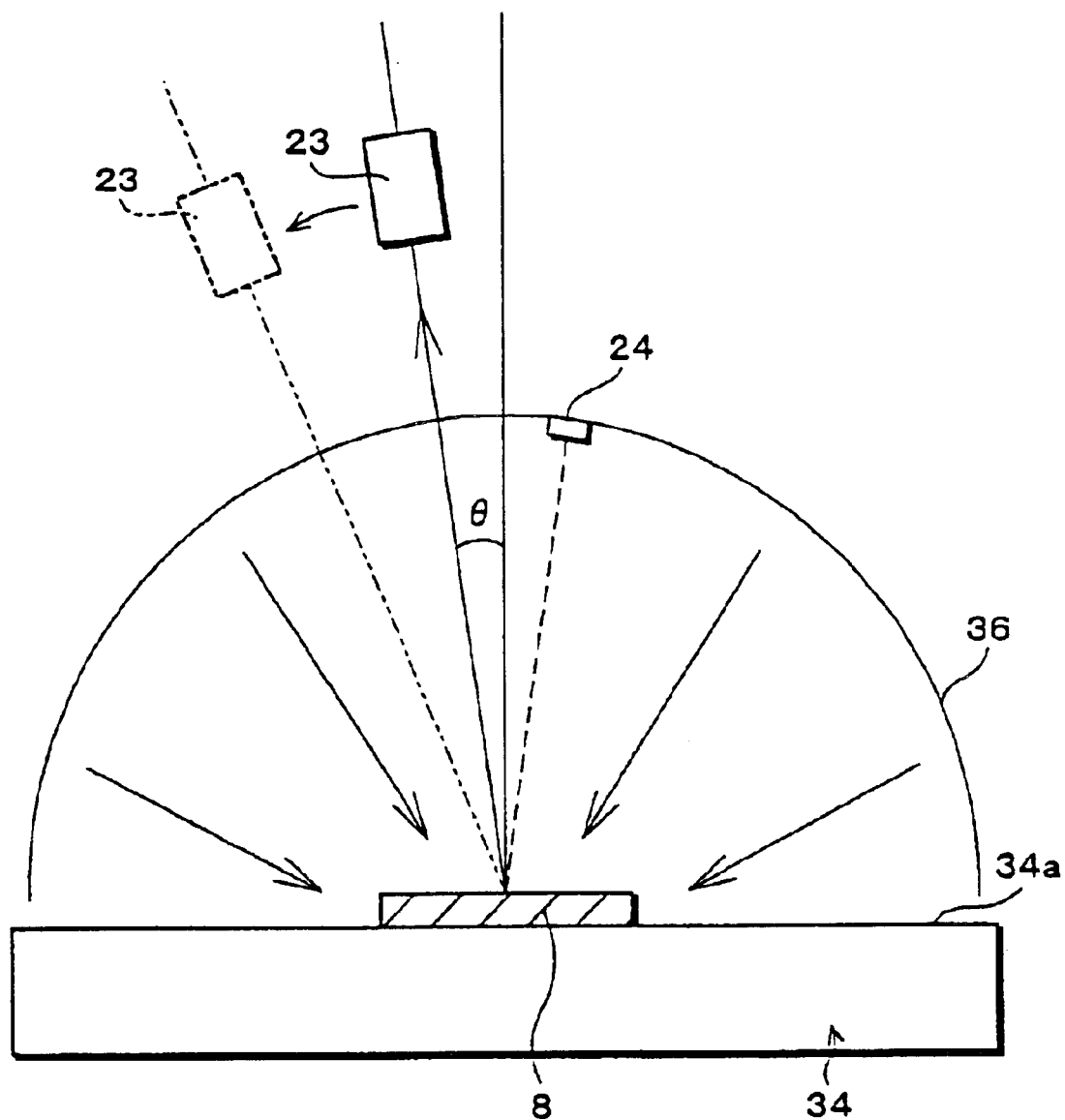
FIG. 6 is a drawing showing a structure of a measurement system for measuring reflectance of reflective liquid crystal display devices in accordance with the respective embodiments of the present invention.
Figure 9:
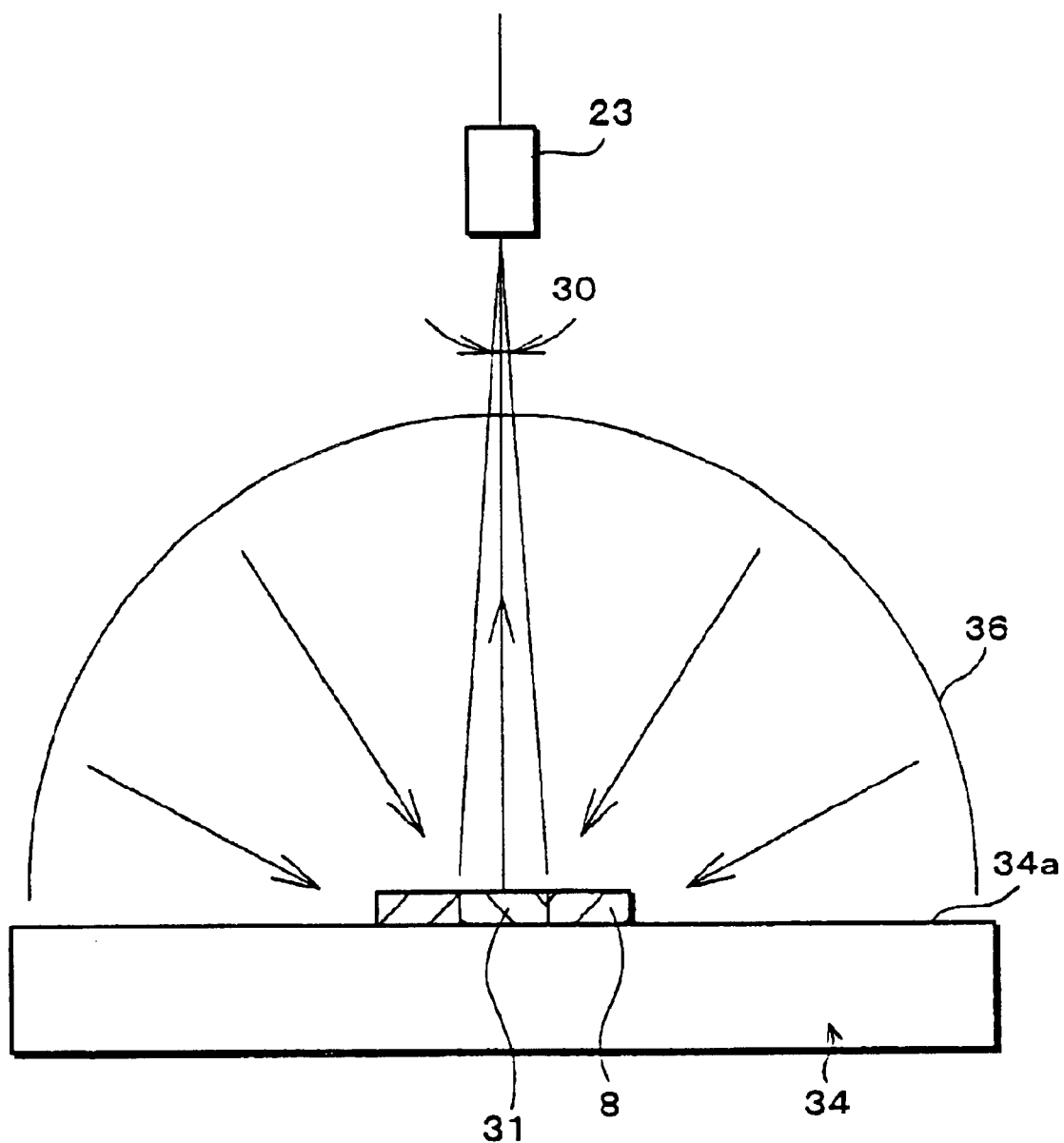
FIG. 9 is a drawing showing a schematic structure of a measurement system for measuring reflectance of the reflective liquid crystal display devices in accordance with the respective embodiments of the present invention.

In view of the foregoing result, the inventors of the present invention have devised a novel measurement system as shown in FIG. 6 and FIG. 9. The measurement system includes a detector 23, a measurement table 34, and a projector 36.

The measurement table 34 is provided so that its upper surface, making up a measurement surface 34a, is horizontal. The projector 36, in the form of a semi-sphere, surrounds the measurement surface 34a so that the light from the projector 36 is projected on the center of the sphere with the same luminance in all directions from the semi-sphere. The semi-sphere has a radius of 8 cm.

The detector 23 has a variable polar angle of photodetect. The "polar angle" is the angle made by a direction normal to the measurement surface 34a from the center of the semi-sphere and a direction of the photoreceptor 23, and is indicated by $\theta$ in FIG. 6. The diameter of a photo-detecting area of the detector 23 is 1 cm.

On the measurement surface 34a at the center of the sphere is placed smallest unit structures 31 of the retro-reflector 8 so that a normal direction of the smallest unit structures 31 coincides a normal direction of the measurement surface 34a. The "normal direction" as used herein is meant to indicate a vertical direction with respect to an imaginary plane connecting vertices of smallest unit structures 31.

The detector 23 is disposed so that the direction of the light path of the detected light coincides the normal direction of the measurement surface 34a at the center of the sphere. Here, a viewing angle 30 of the detector 23 is finely adjusted to exactly cover the smallest unit structures 31 of the retro-reflector 8 in the measurement. The reflectance of the lambertian diffused reflector, which is set at the same position with the other sample, is considered to be 100%.

Figure 10:
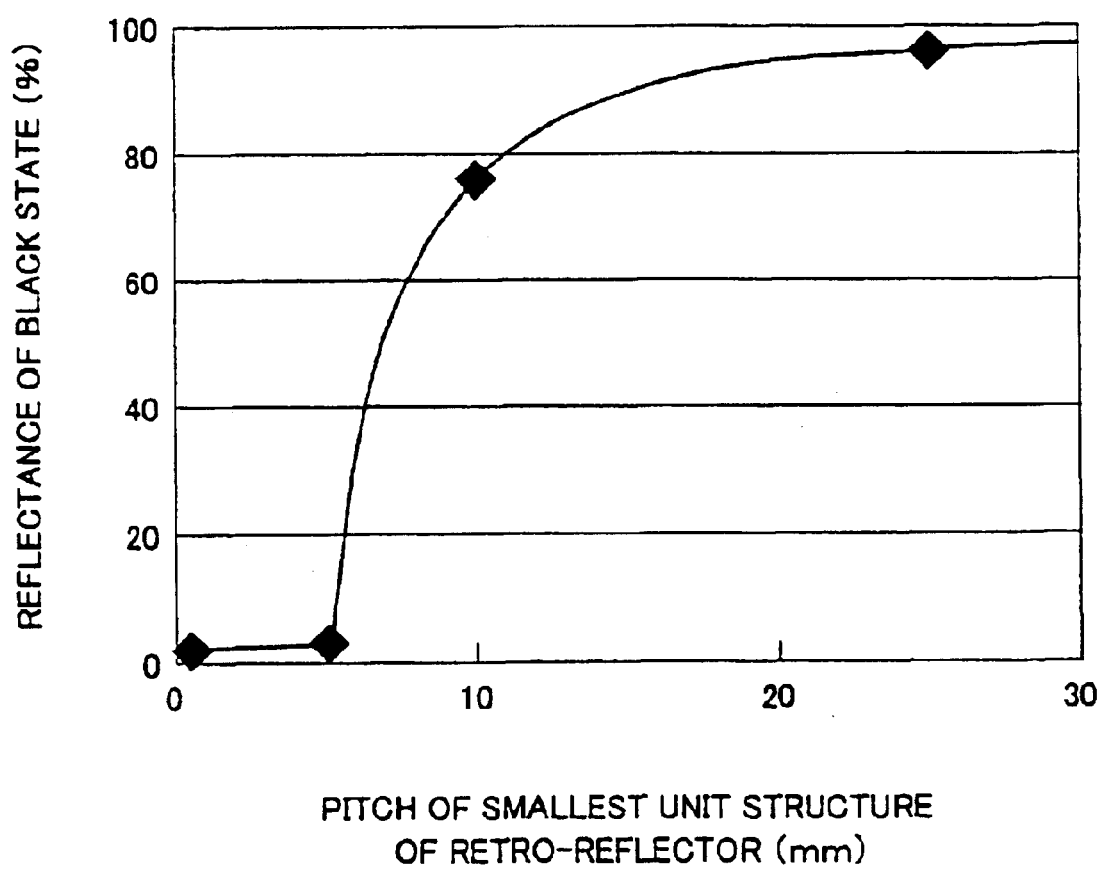
FIG. 10 is a graph showing a relation between a pitch of the smallest unit structure of the retro-reflector and reflectance in black state in accordance with the First Embodiment.

Using this system, measurements were carried out at varying pitches of the smallest unit structures 31. The result is shown in FIG. 10. As is clear from FIG. 10, the pitch 16 of the smallest unit structures 31 needs to be 5 mm or less for a desirable black state.

Figure 11:
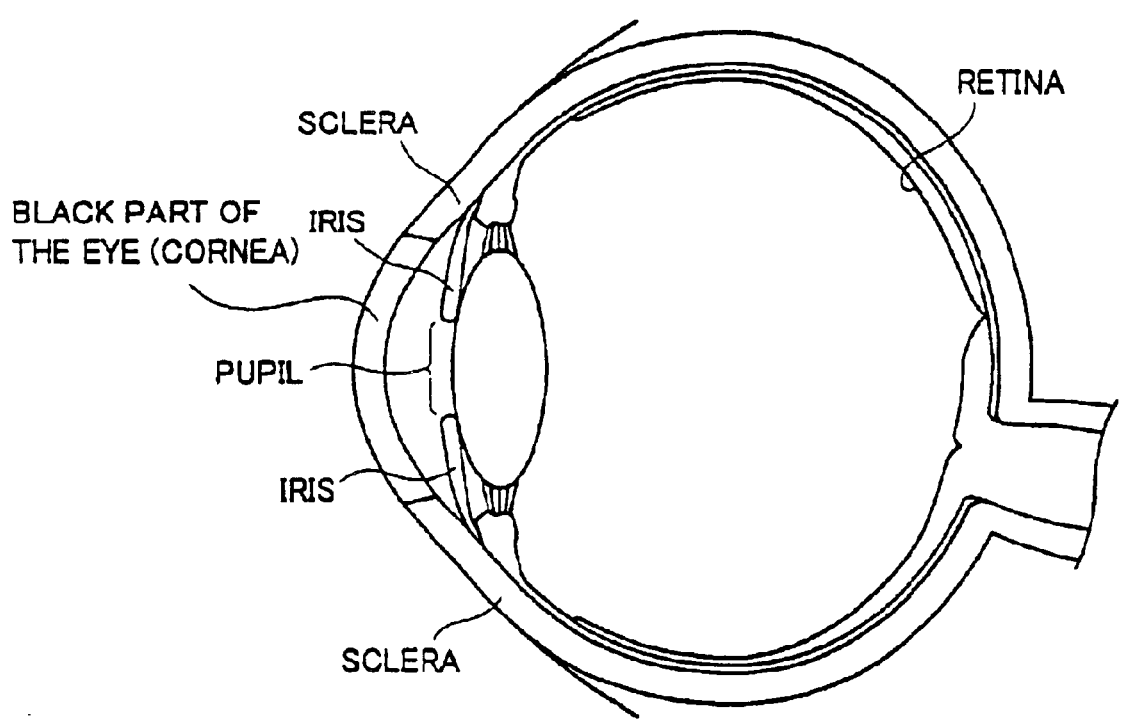
FIG. 11 is an explanatory drawing showing an anatomy of an observer's eye.

The following explains the black part of the eye in more detail. Referring to FIG. 11, the black part of the eye include the pupil and the iris. The color of the iris (reflected light) varies depending on races, and it appears black among Asians, and is slightly colored among Caucasians. The pupil transmits light and thus has the color (reflected light) of internal organs such as the retina. However, the color of the pupil can be regarded as essentially black, since the reflection at the internal organs such as the retina is small, due to the function of the pupil as an aperture which shields unnecessary light, as long as the observer is observing the display (not observing the light source).

In view of these, the foregoing discussion can be re-stated, taking into account the color of the iris, such that the pitch of the smallest unit structure of the retro-reflector 8 is preferably not more than half the size (diameter) of the pupil of around 2 mm (*Encyclopedia of the Eye*, Chapter "questions and answers", Yasumasa Okuzawa, published by Higashiyama Shobo), i.e., not more than 1 mm.

[Second Embodiment]

In this embodiment, measurements of reflectance and a contrast ratio were performed on reflective liquid crystal display devices which were manufactured using the retro-reflector 8 comprising a corner cube array, or without the retro-reflector 8. A total of five kinds of such reflective liquid crystal display devices were manufactured for the measurement.

A first device is a reflective liquid crystal display device 9 (structure shown in FIG. 1) wherein, with respect to the corner cube array making up the retro-reflector 8, light absorbing surface portions 18 in the form of a flat plate are formed at some of the planes of smallest unit structures of the corner cube array as shown in FIG. 3 (e.g., at ridges 8c making up borders of the smallest unit structures). This device will be referred to as "sample A", and a specific manufacturing method thereof will be described later. The reflective liquid crystal display device 9 having the light absorbing surface portions 18 improves a quality of black state as will be described later, and has a high contrast ratio.

A second device is a reflective liquid crystal display device 21, as shown in FIG. 4, which was manufactured by providing a lens sheet 20 for converging incident light (function of convex lens) on the surface of the sample A. The lens sheet 20 is disposed on the front surface of the incident substrate 6 in the present embodiment but the effect of the present embodiment can also be obtained by confirmation even when the lens sheet 20 is placed directly on the retro-reflector 8. This device will be referred to as "sample B".

A third device is the reflective liquid crystal display device 9 wherein, with respect to the corner cube array making up the retro-reflector 8, the light absorbing surface portions 18 in the form of a flat plate are formed at some of the planes making up the smallest unit structures of the corner cube array as shown in FIG. 3, the reflective liquid crystal display device 9 being manufactured using a corner cube array having light absorbing sites, which absorb incident light on vertices or sides, at vertices or sides. This device will be referred to as "sample C", and a specific manufacturing method thereof will be described later.

By the provision of the light absorbing surface portions 18 and the light absorbing sites for absorbing incident light on ridges such as vertices or sides, a quality of black state will further be improved as will be explained later and the contrast ratio can be improved. Note that, the foregoing example is based on the light absorbing sites, but, as will be described later, the same effect can also be obtained by the provision of a light shielding section.

A fourth device is the reflective liquid crystal display device 9 wherein no special treatment has been applied to the corner cube array making up the retro-reflector 8, i.e., all planes (imaginary planes in the normal direction on the ridges 8c making up the borders) among the planes making up the smallest unit structures (corner cubes) of the corner cube array, other than the reflecting planes 19 of FIG. 3(a) through FIG. 3(d), are light transmissive planes. This device will be referred to as "sample R1" as comparative example 1, even though this device within the scope of the present invention.

Figure 5:
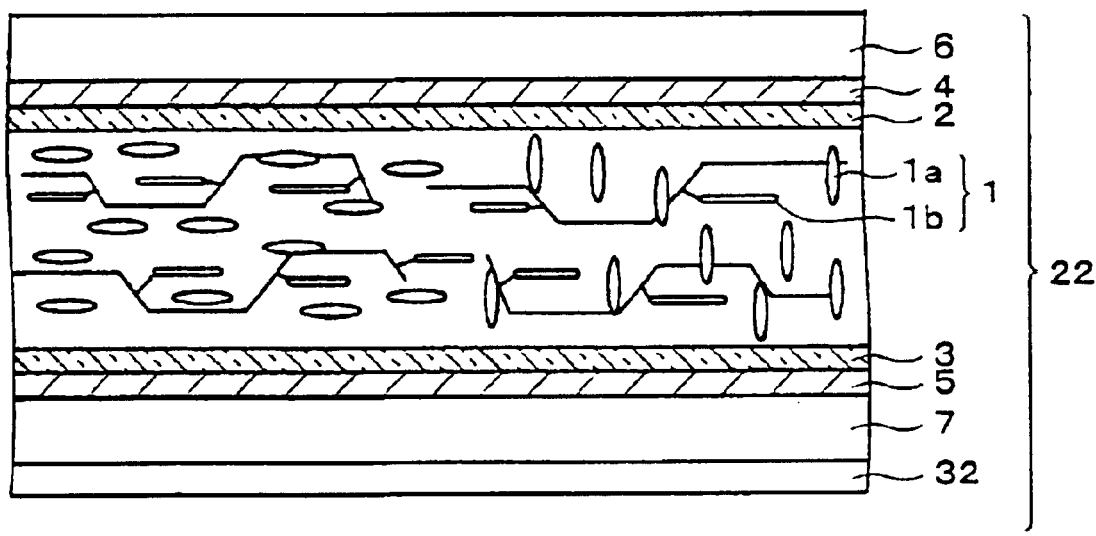
FIG. 5 is a cross sectional view of a reflective liquid crystal display device as Comparative Example 2 of the Second Embodiment.

A fifth device includes an absorbing layer 32 instead of the retro-reflector 8 of FIG. 1, and a structure of the fifth device is shown in FIG. 5. This device will be referred to as "sample R2" as comparative example 2.

FIG. 7(a) through FIG. 7(f) show an example of a lift-off method used in a manufacturing process of the retro-reflectors 8 used in the reflective liquid crystal display devices of sample A and sample C. First, a black resin is press molded using a mold, so as to make a mold resin plate 25a having concave portions 25 of the corner cube shape (see FIG. 7(a)).

The "corner cube shape" refers to a configuration where a corner on a cube is pressed down in a direction from the surface toward the interior of the resin mold plate 25a. Here, the imaginary line connecting the center and the corner of the cube is along, i.e., parallel, to a direction normal to the surface of the resin mold plate 25a.

In the mold resin plate 25a, the concave portions 25 in the form of the corner cube shape are provided in large numbers and closely side by side adjacent to one another. The adjoining concave portions 25 has the ridges 8c, which make up borders, and vertices. The concave portions 25 are thus provided in large numbers so that their vertices are on an imaginary plane 25b, thus forming the corner cube array before the provision of the reflecting plane 19.

Further, the mold resin plate 25a is formed so that the light absorbing surface portions 18, provided in the form of a flat plate at the ridges 8c, shield a passage of light across adjacent concave portions 25. Also, the light absorbing surface portions 18 are formed so that their front end portions are within the same place with respect to the imaginary plane 25b connecting the vertices.

Thereafter, a resist 26 is applied on a molded surface of the mold resin plate 25a by the screen printing method. The resist 26 is made of, for example, the material OFPR-800 (provided by Tokyo Ohka Kogyo Co., Ltd.), and is deposited to a thickness of 4 μm (see FIG. 7(b)).

Then, the resist 26 is pre-baked at 100° C. for 30 minutes, and a photomask 27 is placed on the resist 26 for exposure. The photomask 27 used for the exposure process of samples A and C are photomasks 27a and 27b, respectively, as shown in FIG. 8(a) and FIG. 8(b) (see FIG. 7(c)).

The shapes of the photomasks 27a and 27b are for forming the respective light absorbing surface portions 18 at the ridges 8c of the adjacent concave portions 25 in the form of the corner cube shape. Further, the shape of the photomask 27b is also for forming the light absorbing sites with respect to ridges making up vertices or sides (valleys) of each concave portion 25.

That is, when the photomask 27 is the photomask 27a having the pattern as shown in FIG. 8(a), the light absorbing surface portions 18 can be formed at some of the planes making up the smallest unit structure of the corner cube shape. Further, when the photomask 27 is the photomask 27b having the pattern as shown in FIG. 8(b), it is possible to realize a structure wherein the light absorbing sites are provided for the vertices and sides on the smallest unit structure of the corner cube shape. Therefore, with the foregoing arrangements, it is possible to obtain the reflective liquid crystal display devices 9 and 21 which prevent reflections (phenomenon including reflection and scattering) at the vertices or sides and which have a high contrast ratio.

Thereafter, the resist 26 is developed and silver is deposited on the molded surface of the mold resin plate 25a in the normal direction of the mold resin plate 25a to a thickness of 2000 Å, so as to form a reflecting plane 19. The developer may be, for example, the NMD-32.38% (provided by Tokyo Ohka Kogyo Co., Ltd. (see FIG. 7(d)).

Figure 7A:
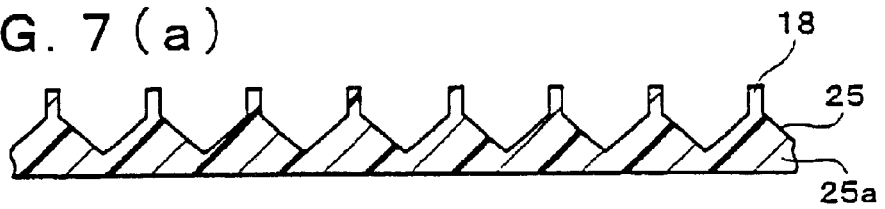
FIG. 7(a) through FIG. 7(f) are cross sectional views schematically showing a manufacturing process of a retro-reflector having concave portions which are in the form of the corner cubes used in the Second Embodiment.
Figure 7B:
Figure 7C:
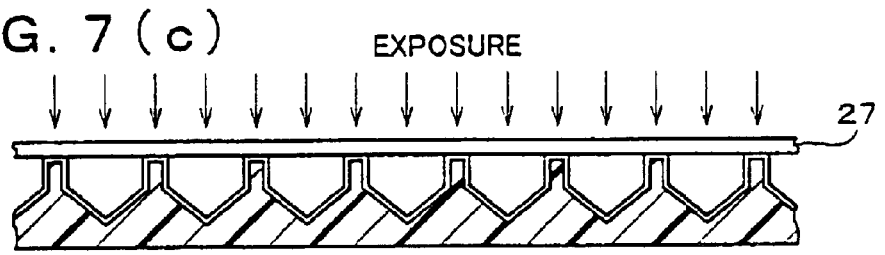
Figure 7D:
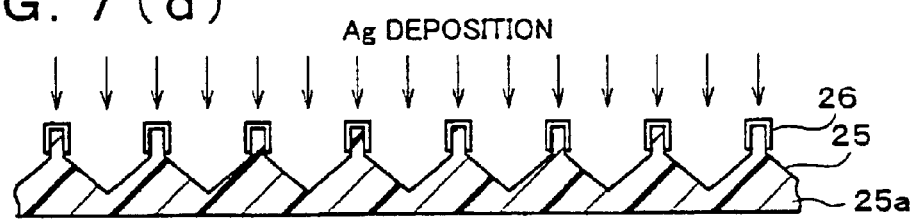
Figure 7E:
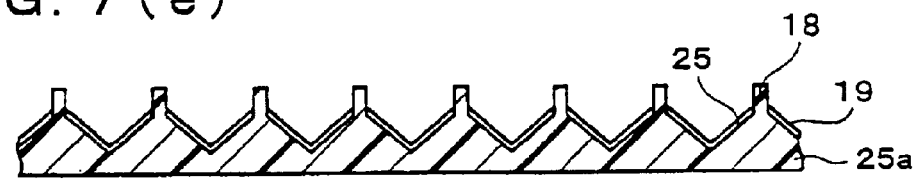
Figure 7F:
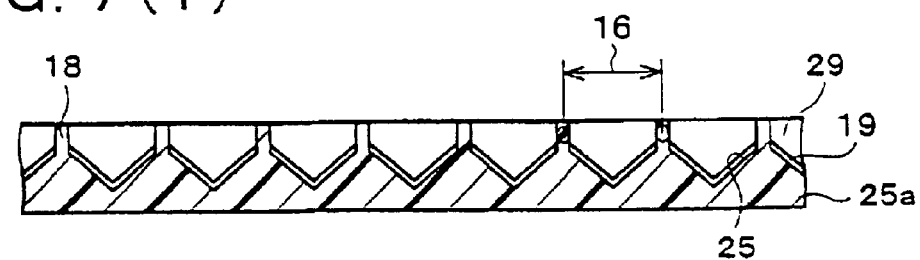

Then, the remained resist 26 is removed (FIG. 7(e)), and the concave portions 25 of the mold resin plate 25a are finally levelled by a transparent resin 29 (FIG. 7(f)). Here, the transparent resin 29 is formed so that its surface coincides the imaginary plane 25b connecting the front end portions of the light absorbing surface portions 18, and the vertices.

The present embodiment described the lift-off method, but the inventors of the present invention have confirmed that it is also possible to employ an ordinary method of patterning a metal such as silver or aluminium after depositing it over the entire surface. Also, the retro-reflector 8 may be integrally formed with the reflection substrate 7 by the foregoing method.

The following describes a measurement method of the foregoing five samples (see FIG. 6). First, the light which was projected from all directions from the semi-sphere was incident on the detector 23, which was provided at an 8° angle with respect to a normal direction of the measurement surface 34a. Here, a light shield 24 was provided so that a regularly reflected component of the light is not incident on the detector 23.

The results of measurement of reflectance and contrast ratio are as follows.

| | | |
|---|---|---|
| Sample A: | reflectance 35% | contrast ratio 18 |
| Sample B: | reflectance 40% | contrast ratio 40 |
| Sample C: | reflectance 32% | contrast ratio 21 |
| Sample R1 (comparative example 1): | reflectance 45% | contrast ratio 3 |
| Sample R2 (comparative example 2): | reflectance 5% | contrast ratio 17 |

It can be seen from the comparison of samples A, B, C and sample R1 (comparative example 1) that the contrast ratio can be greatly improved by providing the light absorbing surface portions 18 at some of the planes of the smallest unit structure of the retro-reflector 8, by providing the lens sheet 20 more toward the observer than the retro-reflector 8, or by providing means such as the absorbing sites for absorbing incident light on vertices or sides of the smallest unit structures (corner cubes) of the retro-reflector, and the light shielding section for shielding light which is irregularly reflected at the vertices or sides. It is also clear from the results of measurement that the same effect can also be obtained by any combinations of these counter-measures.

Further, it was found from the comparison of samples A, B, C and sample R2 (comparative example 2) that improvement in reflectance was larger in the reflective liquid crystal display devices 9 and 21 using the retro-reflectors of samples A, B, and C than the reflective liquid crystal display device 22 using the absorbing layer 32 of sample R2.

The reflective liquid crystal display devices of the present invention can also realize input-device-integrated-type liquid crystal display devices by incorporating a touch panel, without resulting in poor display quality.

The following will explain the case where the light shielding section is provided instead of the light absorbing sites. As shown in FIG. 12(a), without the provision of means for absorbing or shielding light from ridges such as a vertex 8b or a side 8a of the smallest unit structure (corner cube) of the retro-reflector 8, as shown in FIG. 12(b), there are cases where irregularly reflected light 8d at the ridges such as the vertex 8b or the side 8a of the smallest unit structure (corner cube) of the retro-reflector 8, or reflected light 8e of the irregularly reflected light 8d at the opposing reflection plane 19 appears white, resulting in poor black state.

Figure 13A:
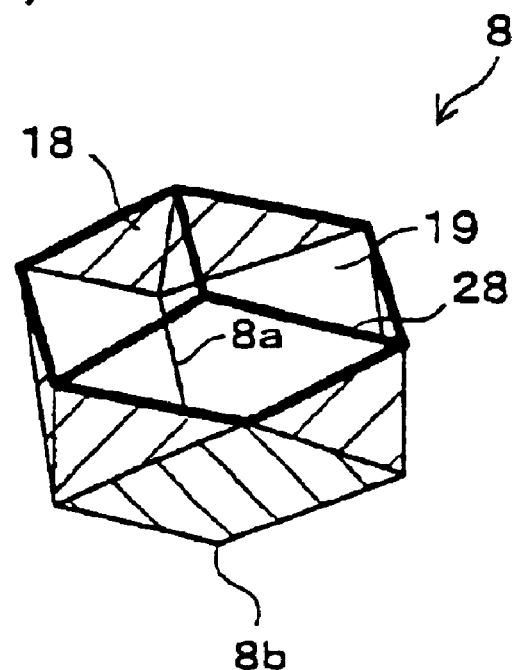

To prevent this, as shown in FIG. 13(a), a light shielding section 28 for shielding the irregularly reflected light from the ridges such as the vertex 8b or the side 8a of the smallest unit structure (corner cube) of the retro-reflector 8 is provided directly above the retro-reflector 8. The light shielding section 28 is provided in the form of a band, covering the vertex 8b or the sides 8a from above, and is preferably made of the same material as that of a black matrix 48BM, which is described later.

Figure 13B:
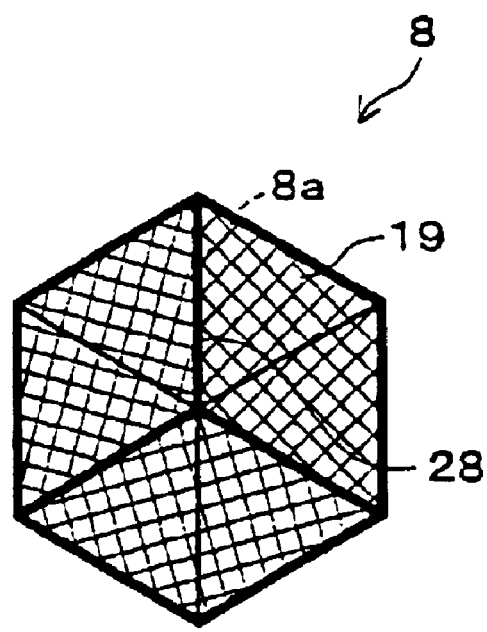

With the light shielding section 28, the irregularly reflected light 8d from the vertex 8b or the side 8a can be shielded as shown in FIG. 13(b), and the incident light on the vertex 8b or side 8a can be reduced to suppress the reflected light 8e, thus improving black state.

Figure 14A:
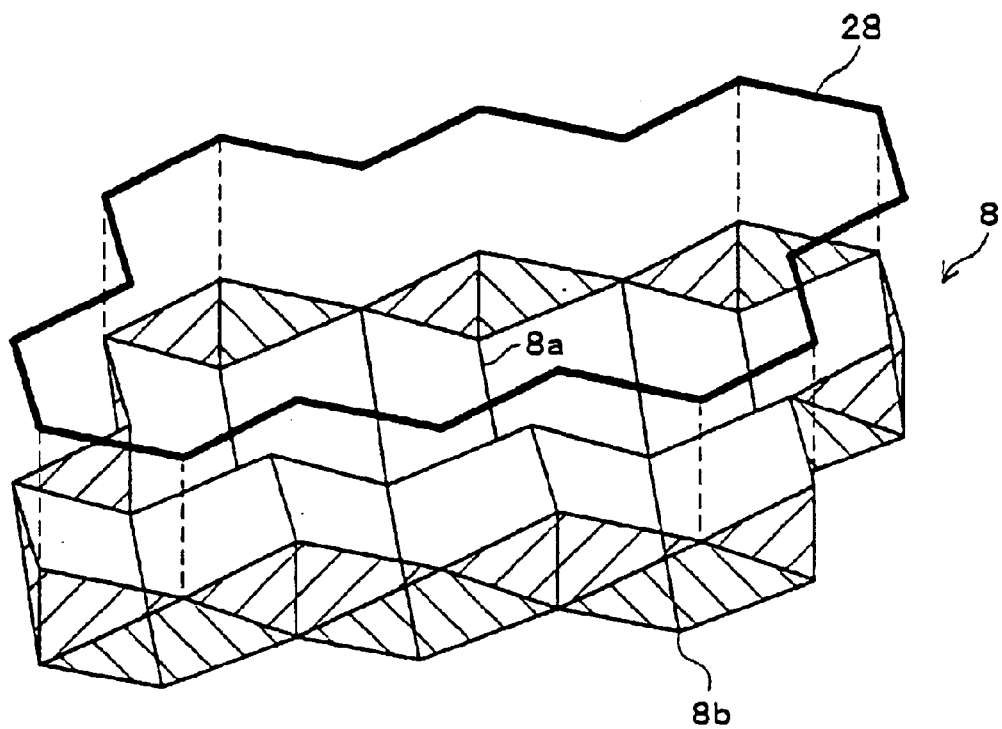
Figure 14B:
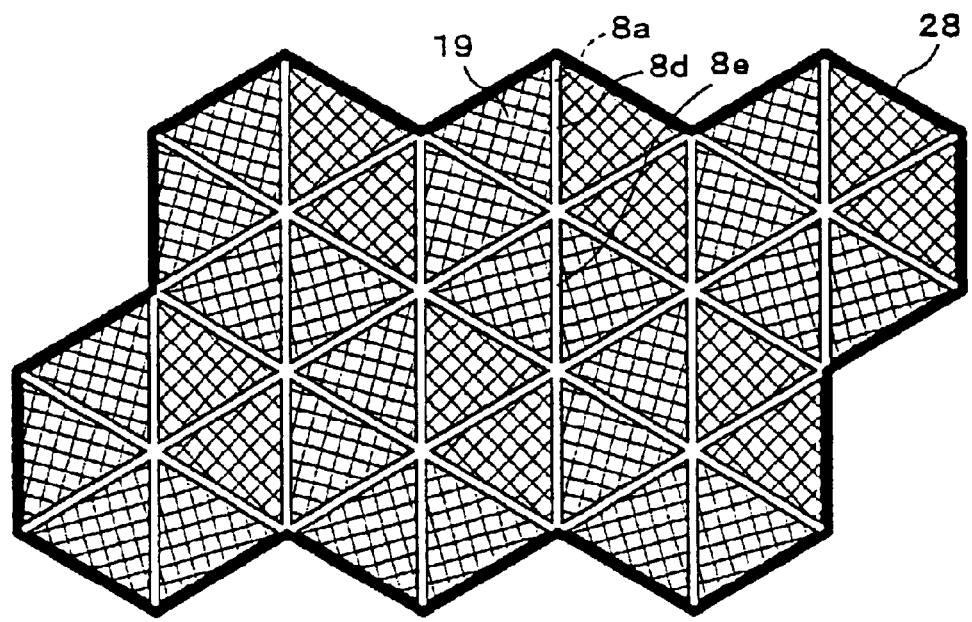
Figure 15A:
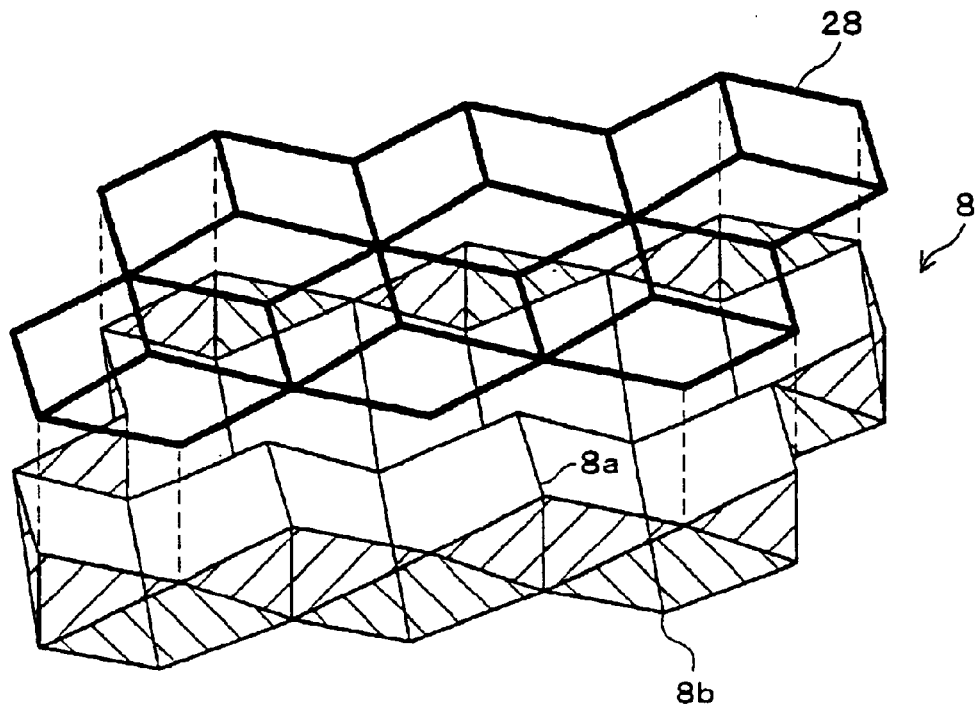
Figure 15B:
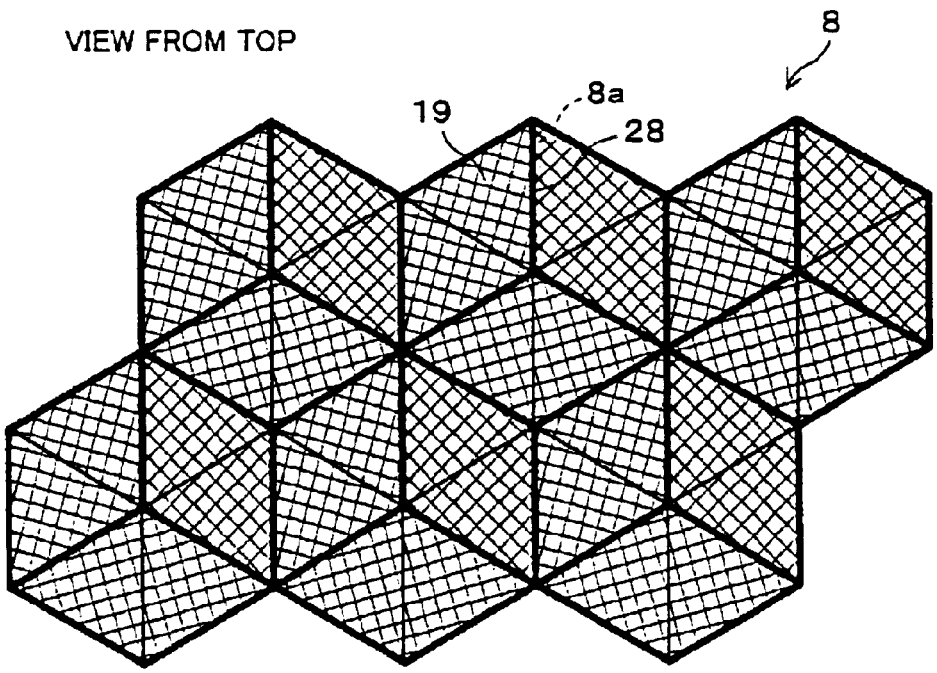

Further, as shown in FIG. 14 and FIG. 15, the light shielding section 28 may be provided at the same level or above a color filter layer 48 (mentioned later), which is separately provided from the retro-reflector 8. In this way, the light shielding section 28 is provided above, but not directly above, the retro-reflector 8. Here, it is preferable that the light shielding section 28 be formed at the same time as the black matrix 48BM (described later) and made of the same material as the black matrix 48BM. A black state can also be improved in this case.

[Third Embodiment]

The following will describe a Third Embodiment of the present invention with reference to FIG. 16 through FIG. 20. Note that, for convenience of explanation, elements having the same functions as those described in the drawings of the foregoing First and Second Embodiments are given the same reference numerals and explanations thereof are omitted here.

Figure 16:
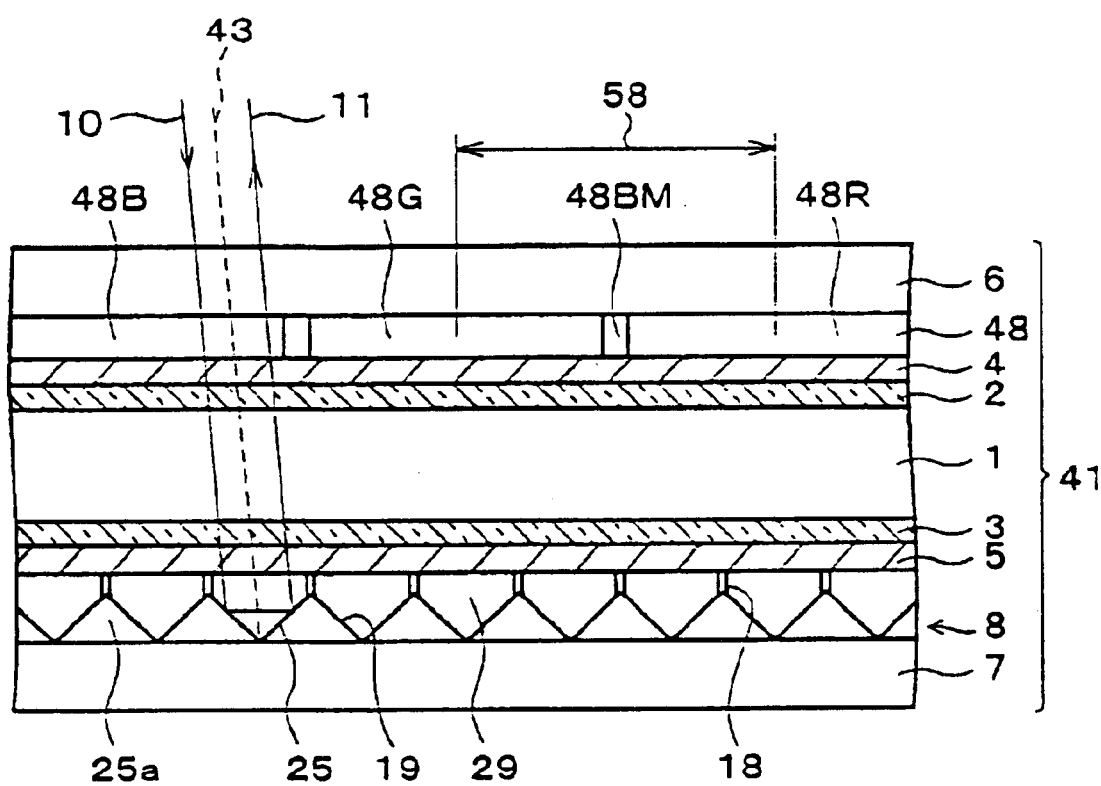
FIG. 16 is a cross sectional view showing a structure of a reflective liquid crystal display device in accordance with a Third Embodiment of the present invention.

As shown in FIG. 16, a liquid crystal panel of a reflective liquid crystal display device 41 as a reflective liquid crystal display device in accordance with the Third Embodiment is the same as the reflective liquid crystal display device 21 of FIG. 4 except that the lens sheet 20 is omitted therefrom and a color filter layer 48 is provided between electrodes 4 and an incident substrate 6.

The color filter layer 48 is provided to realize full-color display. The color filter layer 48 includes color filters 48R, 48G, 48B of red (R), green (G), and blue (B) which are disposed in a predetermined array pattern. In the device 41, pixels are formed, corresponding to the color filters 48R, 48G, and 48B.

Between adjacent color filters 48R, 48G, and 48B is provided a black matrix 48BM. The black matrix 48BM and the color filters 48R, 48G, and 48B function as a light absorbing layer for absorbing light which passes through different pixels, as will be described later in a Fourth Embodiment.

The corner cube array making up a retro-reflector 8 has a characteristic of causing a parallel displacement of a light beam symmetrically with respect to a central axis, in addition to the characteristic of retro-reflecting the incident light back to the direction of incidence. That is, as shown in FIG. 16, the path of an outgoing ray (reflected light) 11 is in near symmetry with that of an incident ray 10 about a central axis 43.

In the reflective liquid crystal display device 41 of the present embodiment, the pitch of the unit structures (i.e., concave portions 25) of the retro-reflector 8 is set to be not more than the pitch of the color filters 48R, 48G, and 48B.

Here, the pitch of the concave portions 25 is the shortest distance between corresponding positions of adjacent concave portions 25 (e.g., between vertices of the concave portions 25 of the corner cube shape) (indicated by pitch 16 in FIG. 2(b), FIG. 7(f) and FIG. 8(a)).

Further, the pitch of the color filters 48R, 48G, and 48B is the shortest distance between corresponding positions of adjacent color filters 48R, 48G, and 48B (e.g., between centers of the color filters) (indicated by pitch 58 in FIG. 16).

In the reflective liquid crystal display device 41, because the pitch 16 of the concave portions 25 of the corner cube shape of the retro-reflector 8 is related to the pitch 58 of the color filters 48R, 48G, and 48B in the foregoing manner, the light incident on the retro-reflector 8 through any color filter 48R, 48G, or 48B is reflected by the retro-reflector 8 and outgoes from the device by passing through the same color filter 48R, 48G, or 48B. Therefore, the problem of the incident ray and the outgoing ray passing through different color filters 48R, 48G, and 48B is avoided, thereby preventing reduction in luminance and chromaticity due to mixed colors.

The display operation of the reflective liquid crystal display device 41 is as described in the First and Second Embodiments.

As described, in the reflective liquid crystal display device 41 of the present embodiment, the pitch 16 of the concave portions 25 of the corner cube shape of the retro-reflector 8 is not more than the pitch 58 of the color filters 48R, 48G, and 48B, and more specifically, the pitch 16 of the concave portions 25 and the pitch 58 of the color filters 48R, 48G, and 48B are 25 μm and 100 μm, respectively.

Therefore, as shown in FIG. 16, the outgoing ray (reflected light) 11 with respect to the incident ray 10 having passed through the color filter 48B passes through the same color filter 48B. That is, in the reflective liquid crystal display device 41, the light incident on the retro-reflector 8 through any color filter 48R, 48G, or 48B, reflected by the retro-reflector 8, outgoes from the device by passing through the same color filter 48R, 48G, or 48B.

Figure 17:
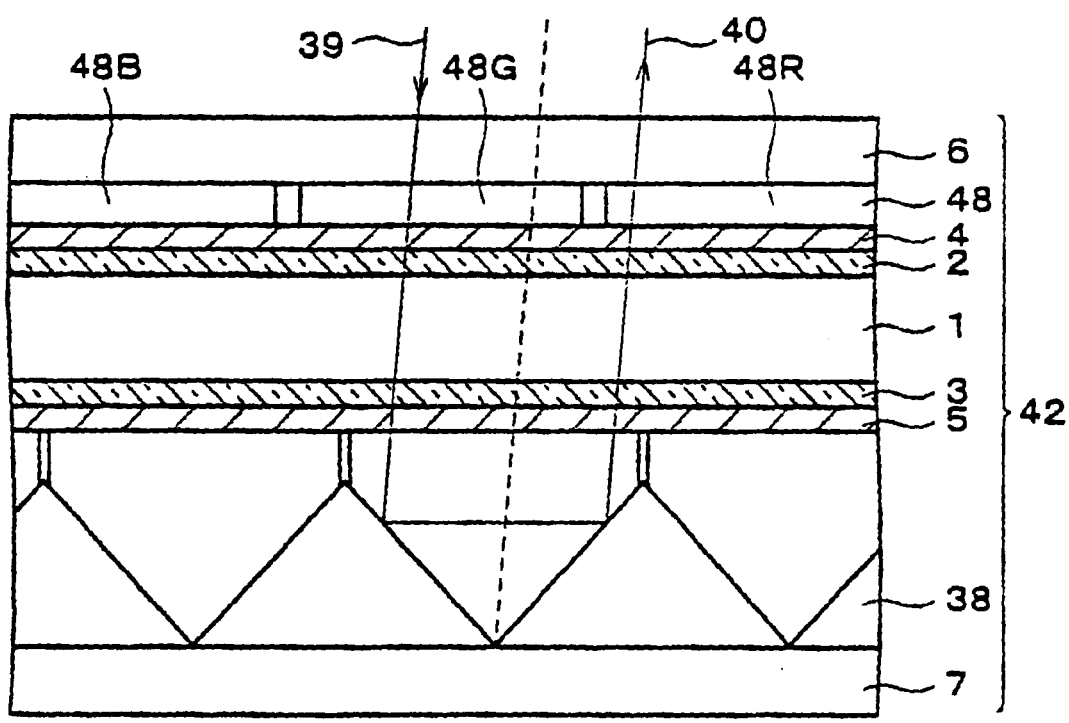
FIG. 17 is a cross sectional view showing a structure of a conventional liquid crystal display device used for comparison.

For comparison with the reflective liquid crystal display device, as shown in FIG. 17, a reflective liquid crystal display device 42 in which a pitch of corner cube array of a retro-reflector 38 is larger than a pitch of the color filters 48R, 48G, and 48B was prepared. Specifically, a pitch of the corner cube array of the retro-reflector 38 is 120 μm, and a pitch of the color filters 48R, 48G, and 48B is 100 μm.

In the reflective liquid crystal display device 42, an outgoing ray (reflected light) 40 with respect to an incident ray 39 having passed through the color filter 48G passes through the color filter 48R, and thus the incident ray 39 and the outgoing ray 40 pass through different color filters 48G and 48R. As a result, luminance and chromaticity are reduced due to mixed colors.

On the other hand, in the reflective liquid crystal display device 41 of the present embodiment, as shown in FIG. 16, the pitch of the concave portions 25 of the retro-reflector 8 is not more than the pitch of the color filters 48R, 48G, and 48B, and therefore the problem of the incident ray and the outgoing ray passing through different color filters 48R, 48G, and 48B is not posed, thus preventing reduction in luminance and chromaticity due to mixed colors.

The ratio of the pitch 16 to the pitch 58 is set to be not more than 1, but it is preferably not more than ½, and more preferably not more than ¼. Further, because the ratio is set at 1/(2n) (n is a natural number), the plurality of smallest unit structures with respect to the pixels can be contained within a single color filter, which makes this ratio setting preferable.

Figure 18:
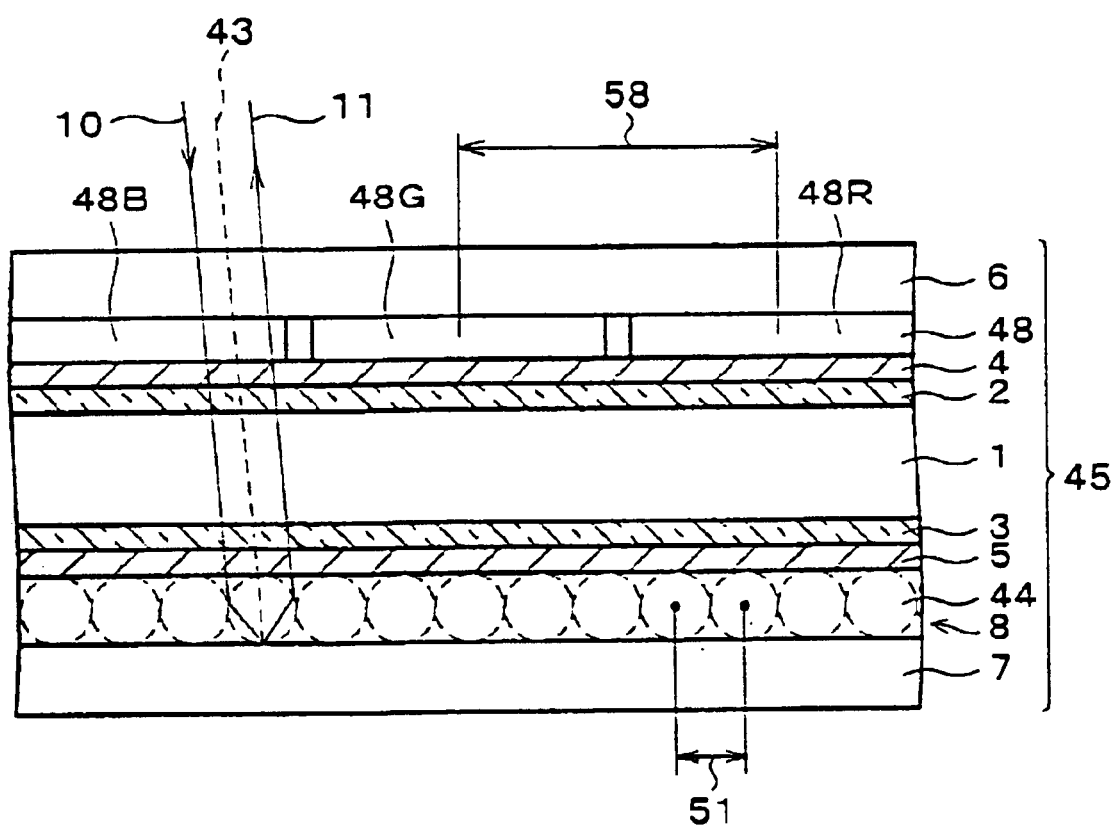
FIG. 18 is a cross sectional view of a modification example of the reflective liquid crystal display device in accordance with the Third Embodiment, showing a structure wherein beads are used as the smallest unit structure of the retro-reflector.

In the liquid crystal display device 41 of the Third embodiment, the retro-reflector 8 adopts the corner cube array. However, not limiting to this, it is also possible, as shown in FIG. 18, to provide a reflective liquid crystal display device 45 having an arrangement (array) in which a plurality of beads (micro spheres) 44 are closely packed together side by side to make up a single layer. In a retro-reflector 8 employing the beads (micro spheres) 44, a pitch 51 of the smallest unit structures is defined as the shortest distance between corresponding positions of adjacent beads 44 (e.g., between centers of the beads 44).

In the reflective liquid crystal display device 45, each bead 44 makes up the smallest unit structure of the retro-reflector 8, and the pitch 51 of the beads 44 of the retro-reflector 8 is not more than the pitch 58 of the color filters 48R, 48G, and 48B. Specifically, the pitch 51 of the beads 44 and a pitch 28 of the color filters 48R, 48G, and 48B are 25 μm and 100 μm, respectively.

Thus, as shown in FIG. 13, the outgoing ray (reflected light) 11 with respect to the incident ray 10 having passed through the color filter 48B passed through the same color filter 48B. That is, in the reflective liquid crystal display device 45, the light incident on the retro-reflector 8 through any color filter 48R, 48G, or 48B, reflected by the retro-reflector 8, outgoes from the device by passing through the same color filter 48R, 48G, or 48B.

Figure 19:
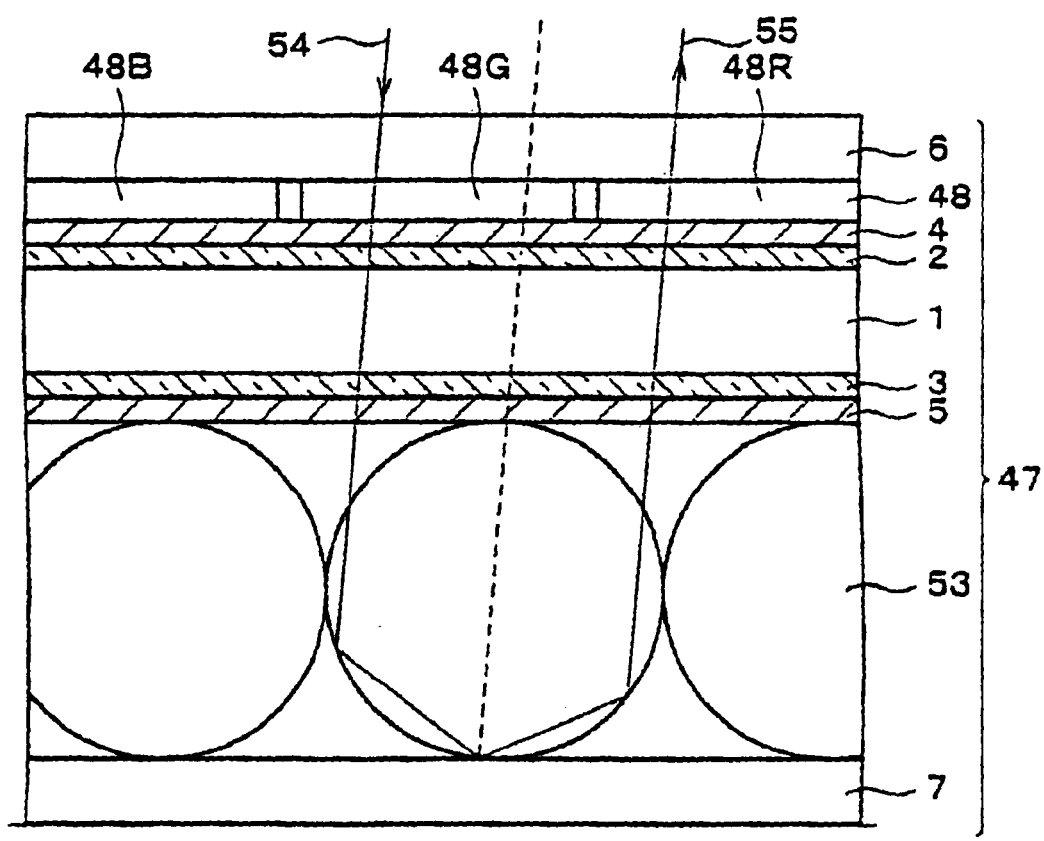
FIG. 19 is a cross sectional view showing a structure of another conventional reflective liquid crystal display device for comparison.

For comparison with the reflective liquid crystal display device 45, as shown in FIG. 19, a reflective liquid crystal display device 47 in which a pitch of beads 53 of a retro-reflector is larger than a pitch of the color filters 48R, 48G, and 48B was prepared. Specifically, a pitch of the beads 53 of the retro-reflector is 120 μm, and a pitch of the color filters 48R, 48G, and 48B is 100 μm.

In the reflective liquid crystal display device 47, an outgoing ray (reflected light) 55 with respect to an incident ray 54 having passed through the color filter 48G passes through the color filter 48R, and thus the incident ray 54 and the outgoing ray 55 pass through different color filters 48G and 48R. As a result, luminance and chromaticity are reduced due to mixed colors.

On the other hand, in the reflective liquid crystal display device 45 of the present embodiment, as shown in FIG. 18, the pitch of the beads 44 of the retro-reflector 8 is not more than the pitch 58 of the color filters 48R, 48G, and 48B, and therefore the problem of the incident ray 10 and the outgoing ray 11 passing through different color filters 48R, 48G, and 48B is not posed, thus preventing reduction in luminance and chromaticity due to mixed colors.

Further, the retro-reflector 8 may have an arrangement, other than the corner cube array or bead array, employing a micro lens array which is made up of a plurality of micro lenses. The retro-reflector 8 may use any reflecting material as long as it has the characteristic of retro-reflecting incident light back to the direction of incidence, and the characteristic of causing a parallel displacement of a light beam symmetrically with respect to a central axis.

Figure 20:
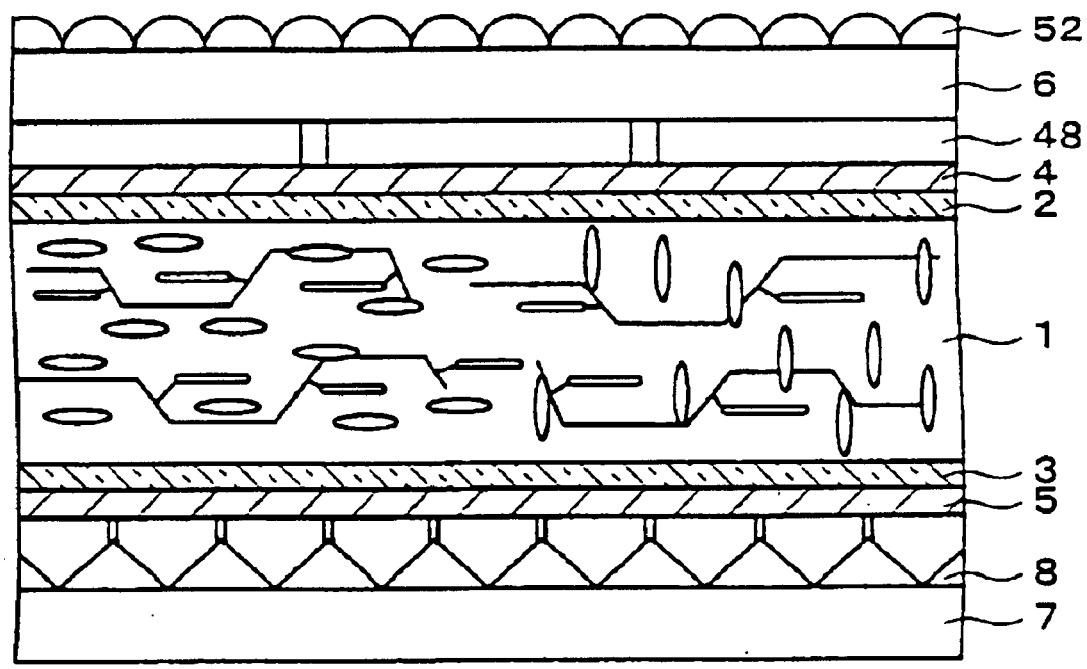
FIG. 20 is a cross sectional view of another modification example of the reflective liquid crystal display device in accordance with the Third Embodiment, showing a structure wherein a lens sheet is provided more toward the incident side than the retro-reflector.

It is also possible to have an arrangement, as shown in FIG. 20, wherein a lens sheet 52, similar to the lens sheet 20, is provided more toward the incident side than the retro-reflector 8. This improves the retro-reflectivity of the retro-reflector 8, which makes it possible to realize a reflective liquid crystal display device capable of a bright white state and having a high contrast ratio. Note that, the lens sheet 52 is provided on the surface (front surface) of the incident substrate 6 in the arrangement of FIG. 20, but the lens sheet 52 may alternatively be provided directly on the retro-reflector 8.

[Fourth Embodiment]

The following will describe a Fourth Embodiment of the present invention with reference to FIG. 21 through FIG. 25. Note that, elements having the same functions as those described in the drawings of the foregoing First through Third Embodiments are given the same reference numerals and explanations thereof are omitted here.

Figure 21:
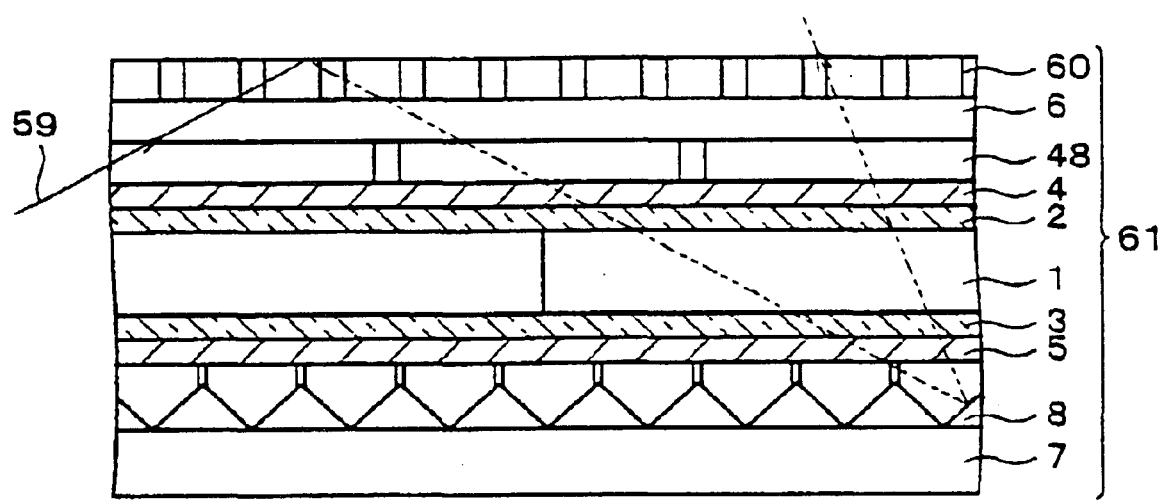
FIG. 21 is a drawing showing a structure of a reflective liquid crystal display device in accordance with a Fourth Embodiment of the present invention.

As shown in FIG. 21, a reflective liquid crystal display device 61 of the present invention differs from the reflective liquid crystal display device 41 of the Third Embodiment in a plurality of louvers (light absorbing section) 60, which are provided on the incident substrate 6. The other structure is the same as that of the reflective liquid crystal display device 41. In the present embodiment, a light control film (provided by Sumitomo 3M Ltd.) is used as the louver 60.

Figure 22:
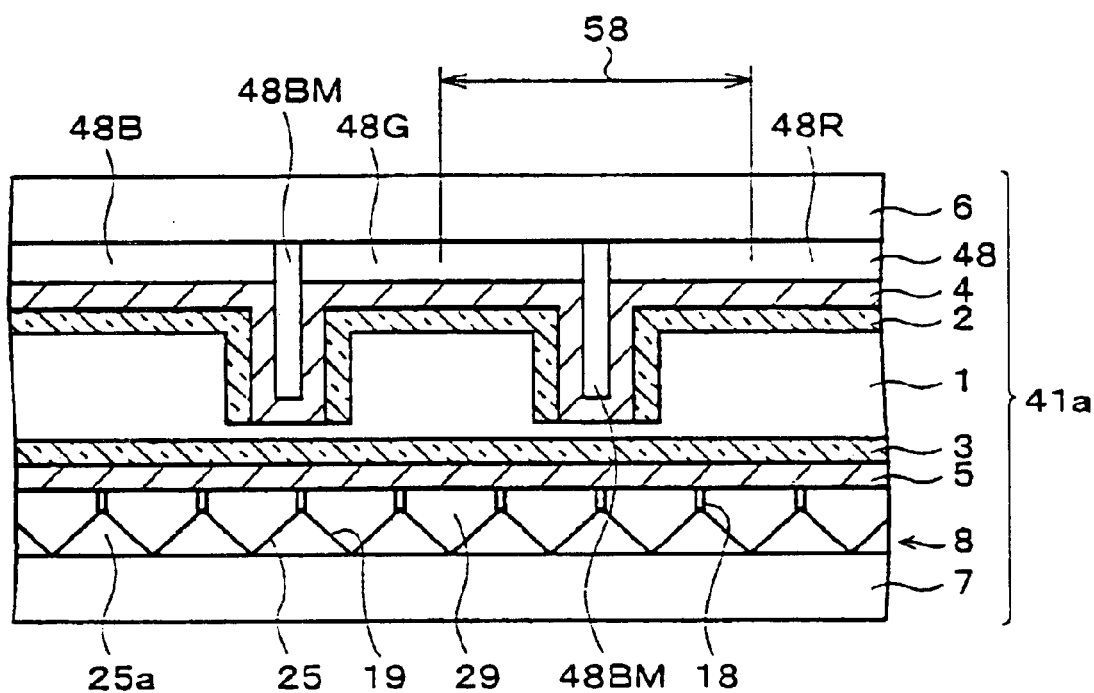
FIG. 22 is a cross sectional view showing a structure of one modification example of the reflective liquid crystal display device.

The louvers 60 allow passage of light within a range of a viewing angle, which is determined by the size of a display surface of the reflective liquid crystal display device 61, and usage of a display, with respect to a thickness direction of the incident substrate 6 (i.e., vertical direction with respect to a surface direction of the incident substrate 6); however, the louvers 60 are essentially a light absorbing layer which absorbs light which passes through different pixels, and are a light-shielding element for shielding light within a predetermined range outside the area of the viewing angle. Further, as shown in FIG. 22, it is also possible to employ a reflective liquid crystal display device 41a in which the black matrix 48BM of a color filter section 48 is in the form of a louver.

Figure 23:
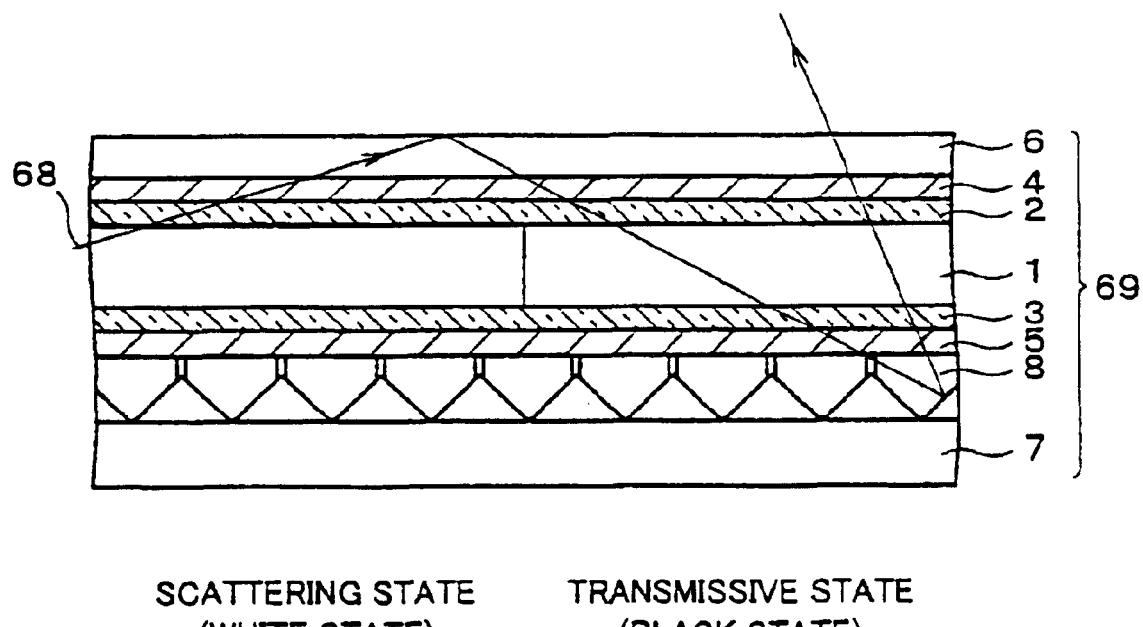
FIG. 23 is a cross sectional view showing a structure of yet another conventional reflective liquid crystal display device for comparison.

In a reflective liquid crystal display device 69 having no louvers, as shown in FIG. 23, there are cases where a part of incident light on pixels in a white state, i.e., in a scattering state, or a part of incident light on pixels in a black state, i.e., in a transmissive state, is incident as stray light 68 on other pixels. When the stray light 68 from other pixels is incident on the black state pixel, i.e., on pixels in a transmissive state, the travelling direction of the light beam is deflected by the retro-reflector 8 of the corresponding pixel and the light outgoes from the liquid crystal panel. This increases reflectance of the black state and causes deterioration of the black state.

On the other hand, as shown in FIG. 21, in the reflective liquid crystal display device 61, by the provision of the louvers 60, stray light 59 from the other pixels can be absorbed by the louvers 60. FIG. 21 shows how the stray light 59 is absorbed and does not enter other pixels, by the alternate two short and long line.

In contrast, in the reflective liquid crystal display device 61 of the present embodiment, the stray light 59 from other pixels can be absorbed by the louvers 60, thus suppressing increase in reflectance of the black state in a viewing direction which is inclined with respect to a direction normal to the display surface, and thus realizing a desirable black state. This effect is especially notable when the retro-reflector 8 employs the corner cube array.

The foregoing effect can also be realized by the arrangement of the reflective liquid crystal display device 41 of the Third Embodiment as shown in FIG. 24 in which the color filter layer 48 acts as the light absorbing layer. That is, stray light 62 from other pixels is absorbed by the black matrix 48BM, and sufficiently reduced essentially by passing through the plurality of color filters 48R, 48G, and 48B, thus maintaining a desirable black state.

Figure 25:
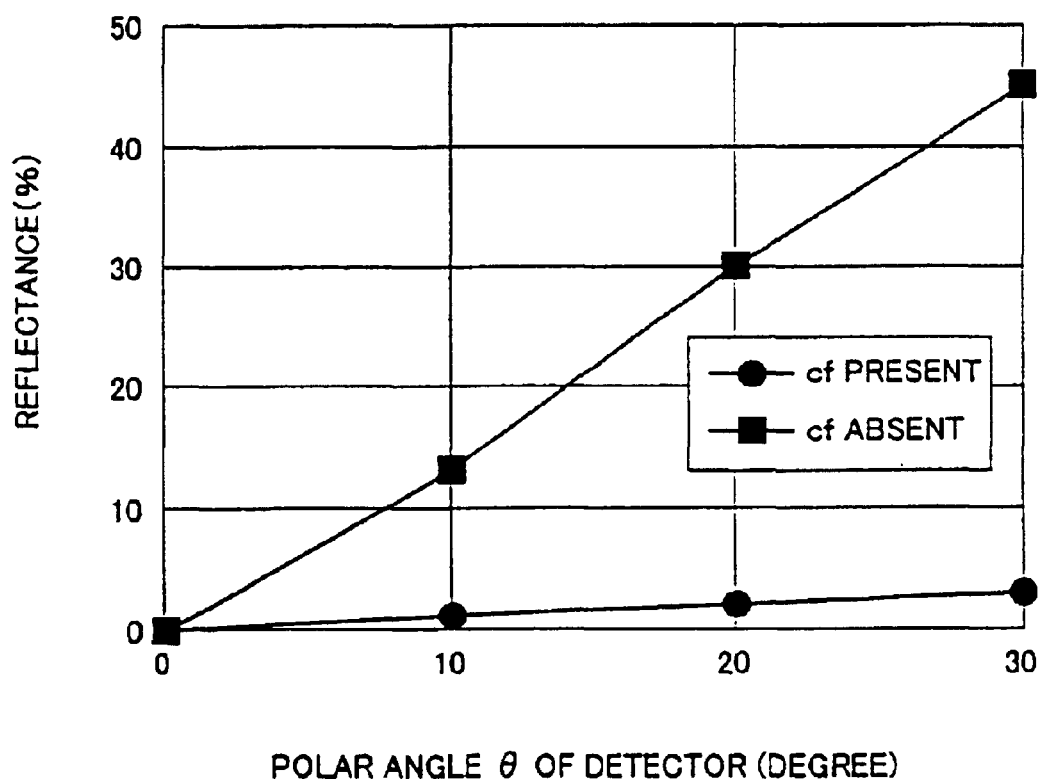
FIG. 25 is a graph showing polar angle dependence of reflectance in a black state in the reflective liquid crystal display device.

In order to examine the effect by the provision of the color filters 48R, 48G, and 48B, which also act as the light absorbing section, the following experiment was conducted. Specifically, a measurement system similar to that shown in FIG. 9 was used to measure reflectance of a black state when scattered light was incident on a reflective liquid crystal display device which was manufactured in the same manner as the reflective liquid crystal display device 41 except for the addition of the color filters 48R, 48G, and 48B. Note that, as in the First Embodiment, the reflectance of the lambertian diffused reflector was 100%. The results are as shown in FIG. 25.

By this provision of the color filters 48R, 48G, and 48B, the reflectance of the black state was reduced also in a viewing direction which is inclined with respect to a direction normal to the display surface (inclined viewing angle), compared with the case without the color filters 48R, 48G, and 48B, thus improving a quality of black state.

As described, by providing the light absorbing layers such as the louvers 60 and/or the color filter layer, increase in reflectance of the black state in the viewing direction can be suppressed and a desirable black state can be realized.

[Fifth Embodiment]

Figure 26:
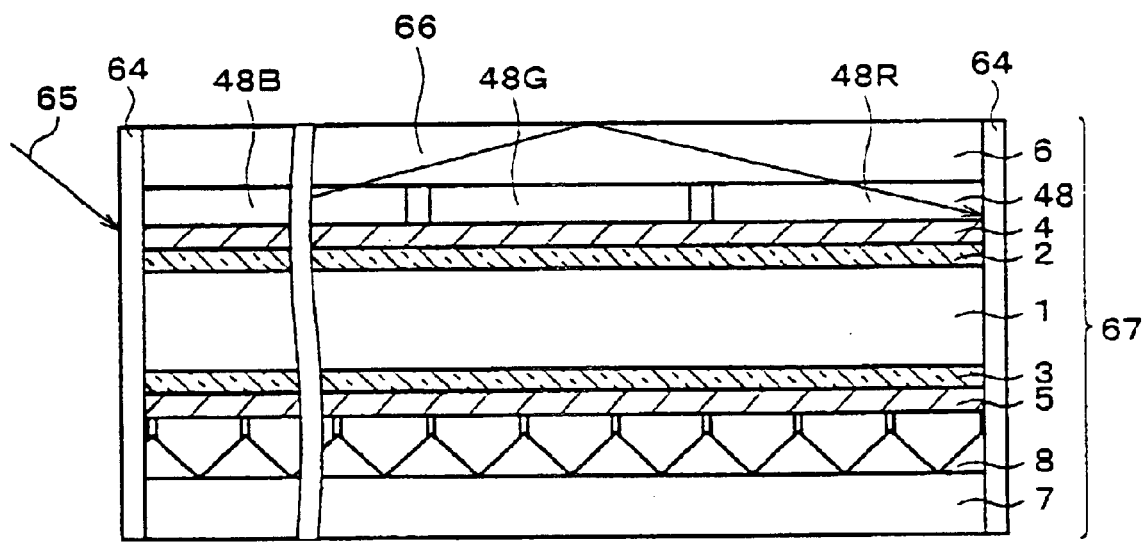
FIG. 26 is a cross sectional view showing a structure of a reflective liquid crystal display device in accordance with a Fifth Embodiment of the present invention.

The following will describe a Fifth Embodiment of the present invention with reference to FIG. 26. Note that, elements having the same functions as those described in the drawings of the foregoing First through Fourth Embodiments are given the same reference numerals and explanations thereof are omitted here.

As shown in FIG. 26, a reflective liquid crystal display device 67 of the present embodiment differs from the reflective liquid crystal display device 41 of the Third Embodiment in a light absorbing element 64 which covers a side surface of a liquid crystal panel making up a display panel (particularly, side surface of the liquid crystal layer 1). The other arrangement is the same as that of the reflective liquid crystal display device 41.

The reflective liquid crystal display device 67, by the provision of the light absorbing element 64, prevents entry of external light 65 into the liquid crystal panel. Further, adverse effects of black state, which result from scattering of stray light 66 reaching a side surface of the liquid crystal panel by travelling inside the device, can be prevented, thus realizing a desirable black state.

Note that, the light absorbing element 64 is preferably provided on all four sides of the liquid crystal panel (side surfaces of a panel composed up of the substrates 6 and 7). Further, the material of the light absorbing element 64 is not particularly limited but the same material as that of bezel, the louver 60 or the black matrix 48BM can be used. Further, the light absorbing element 64 is preferably provided so that a layer of low refractive index, such as air, does not occupy the spacing between the reflective liquid crystal display device and the light absorbing element 64.

[Sixth Embodiment]

The following will describe a Sixth Embodiment of the present invention with reference to FIG. 27(a) through FIG. 27(e). Note that, elements having the same functions as those described in the drawings of the foregoing First through Fifth Embodiments are given the same reference numerals and explanations thereof are omitted here.

Figure 27A:
FIG. 27(a) through FIG. 27(e) are cross sectional views showing a manufacturing process of a retro-reflector in accordance with a Sixth Embodiment of the present invention.
Figure 27B:
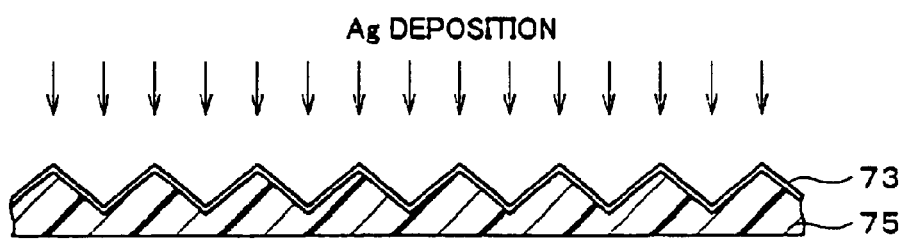
Figure 27C:
Figure 27D:
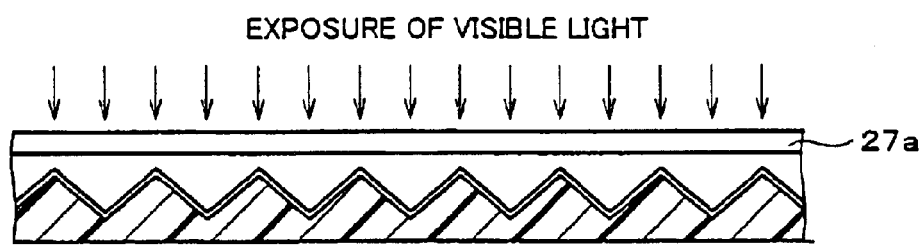
Figure 27E:
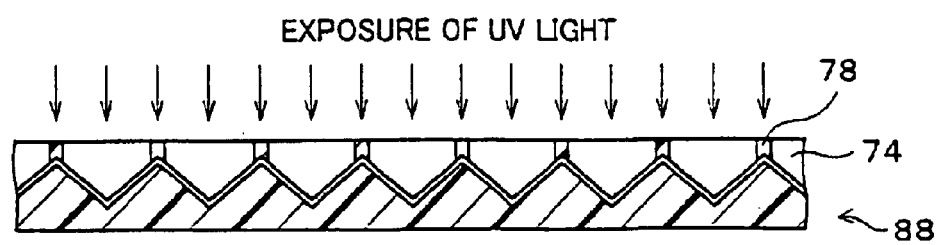

As shown in FIG. 27(e), the reflective liquid crystal display device of the present embodiment includes, in place of the retro-reflector 8, a retro-reflector 88 having light absorbing surface portions 78 having the same function as the light absorbing surface portions 18. The light absorbing surface portions 78 are made of a photosensitive material which is colored by irradiation of light. The other structure may be any of the First through Fifth Embodiments.

Incidentally, the light absorbing surface portions 18 of the plate shape, which are molded by mold-pressing, had a ratio of height to thickness (aspect ratio) at the maximum of 10. This is due to the absence of surrounding resin, which resulted in failure in molding even when a mold having an aspect ratio exceeding 10 was used. That is, it was difficult to make a light absorbing surface portions 18 having an aspect ratio exceeding 10.

On the other hand, the light absorbing surface portions 78 made of a photosensitive material can be finely formed in the form of a thin film, and, during molding, a portion to be the light absorbing surface portions 78 (both ends in the thickness direction) is surrounded by resin and supported thereby, thus realizing a thin film with the aspect ratio exceeding 10, or even exceeding the more preferably value of 30. In other words, the thickness of the light absorbing surface portions 78 can be made thinner. Therefore, with the reflective liquid crystal display device employing the retro-reflector 88 having the light absorbing surface portions 78, the aperture of the retro-reflector 88 can be improved, thereby further improving a display quality of white state as well.

The following describes a manufacturing method of the retro-reflector 88. First, a black resin is press molded using a mold so as to prepare a mold resin plate 75 having a plurality of adjoining concave portions 72 of the corner cube shape (see FIG. 27(*a*)). Then, silver is deposited on the surface of the concave portions 72 in a normal direction of the mold resin plate 75 in a thickness of 2000 Å so as to form a metal thin film 73 (see FIG. 27(*b*)). Thereafter, the plate is leveled using a transparent resin 74 containing a photosensitive material (see FIG. 27(*c*)).

The transparent resin 74 including a photosensitive material contains, for example, polyethylene glycol (binder), 2,2'-bis(o-chlorophenyl)-4,4',5,5'-tetraphenyl-3,3'-bisimidazol (photosensitive halogen), leuco crystal violet (coloring agent), and 1,6-pyrene quinone (photo-reducing agent).

Thereafter, using a photomask 27*a*, for example, as shown in FIG. 8(*a*), exposure was performed by visible light (400 nm to 500 nm) (see FIG. 27(*d*)). Then, after removing the photomask, the entire plate surface was exposed by the UV light to color and fix it, so as to obtain the retro-reflector 88 having the light absorbing surface portions 78 (see FIG. 27(*d*)). The light absorbing surface portions 78 are provided on the metal thin film 73 at the borders (ridges 8*c*) of adjoining concave portions 72.

The manufacturing process of the retro-reflector 88 of FIG. 23 differs from that of the retro-reflector 8 of FIG. 7 in the presence or absence of the wall structure (to be the light absorbing surface portion 18) in the shape of the corner cube array during mold pressing. That is, contrary to FIG. 7(*a*) having a wall structure (light absorbing surface portions 18), no wall structure is present in FIG. 27(*a*).

Generally, it is difficult to resin-mold a fine structure having a wall thinner than its height (structure with a high aspect ratio), so is manufacture of a mold used therefor. As a result, the thickness of the wall is actually increased, which leads to deficiency of a smaller aperture in the reflective liquid crystal display device.

This drawback can be overcome by the present embodiment wherein the light absorbing surface portions 78, in place of the light absorbing surface portions 18, are manufactured from a photosensitive material which is colored by irradiation of light.

Note that, the First through Sixth Embodiments were based on the example where the reflective display devices were reflective liquid crystal display devices. However, the present invention is also applicable to reflective display devices other than the reflective liquid crystal display devices (e.g., flat-panel display device which is switched between a transmissive state and a scattered state).

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A retro-reflector, comprising:

a plurality of adjoining retro-reflecting sections for reflecting incident light so that an outgoing ray of the reflected light is substantially parallel to the incident light, wherein light absorbing surface portions for absorbing light are provided at borders of the retro-reflecting sections.

2. The retro-reflector as set forth in claim 1, wherein said light absorbing surface portions are provided in a standing direction with respect to a surface direction of the retro-reflecting section.

3. The retro-reflector as set forth in claim 1, wherein the retro-reflecting sections are in a form of a corner cube array, and the light absorbing surface portions are formed so that front end portions thereof make up a single plane with respect to an imaginary plane connecting respective vertices of the retro-reflecting sections.

* * * * *